United States Patent
Islam et al.

(10) Patent No.: US 11,470,489 B2
(45) Date of Patent: Oct. 11, 2022

(54) SYNCHRONIZATION SIGNAL BLOCK AND PHYSICAL DOWNLINK CONTROL CHANNEL SEARCH SPACE MONITORING BASED ON USER EQUIPMENT BEAMFORMING CAPABILITY

(71) Applicant: QUALCOMM Incorporated, San Diego, CA (US)

(72) Inventors: Muhammad Nazmul Islam, Littleton, MA (US); Juergen Cezanne, Ocean Township, NJ (US); Joseph Patrick Burke, San Diego, CA (US); Dai Lu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 16/737,532

(22) Filed: Jan. 8, 2020

(65) Prior Publication Data
US 2020/0229008 A1    Jul. 16, 2020

Related U.S. Application Data

(60) Provisional application No. 62/791,675, filed on Jan. 11, 2019.

(51) Int. Cl.
*H04W 24/08* (2009.01)
*H04W 8/24* (2009.01)
(Continued)

(52) U.S. Cl.
CPC .......... *H04W 24/08* (2013.01); *H04B 17/309* (2015.01); *H04L 1/0026* (2013.01);
(Continued)

(58) Field of Classification Search
None
See application file for complete search history.

(56) References Cited

U.S. PATENT DOCUMENTS 9,048,993 B2    6/2015  Khandekar et al.
10,826,568 B1 *  11/2020  Zhou ............... H04B 7/088
(Continued)

FOREIGN PATENT DOCUMENTS

EP          3451553 A2    6/2019
WO     WO-2018082528 A1   5/2018
(Continued)

OTHER PUBLICATIONS

U.S. Appl. No. 62/791,675, filed Jan. 11, 2019, 115 pages.
(Continued)

*Primary Examiner* — Otis L Thompson, Jr.
(74) *Attorney, Agent, or Firm* — Danai Nelisile Mhembere; Holland & Hart LLP

(57) ABSTRACT

Methods, systems, and devices for wireless communications are described. Generally, the described techniques provide for transmitting, from a user equipment (UE) to a base station, a report indicating a beamforming capability of the UE, receiving, from a base station, a configuration for a plurality of control resource sets (CORESETs) based at least in part on the report, selecting multiple CORESETs of the plurality of CORESETs, and monitoring the selected multiple CORESETs during a monitoring occasion. In some examples, the UE may also monitor one or more unselected CORESETs that have a quasi co-location relationship with one of the selected CORESETs.

29 Claims, 16 Drawing Sheets

(51) Int. Cl.
- *H04W 72/04* (2009.01)
- *H04L 5/10* (2006.01)
- *H04L 5/00* (2006.01)
- *H04B 17/309* (2015.01)
- *H04L 1/00* (2006.01)
- *H04W 80/02* (2009.01)
- *H04W 76/27* (2018.01)
- *H04W 16/28* (2009.01)
- *H04W 56/00* (2009.01)

(52) U.S. Cl.
CPC .............. *H04L 5/0051* (2013.01); *H04L 5/10* (2013.01); *H04W 8/24* (2013.01); *H04W 16/28* (2013.01); *H04W 56/001* (2013.01); *H04W 72/042* (2013.01); *H04W 72/046* (2013.01); *H04W 76/27* (2018.02); *H04W 80/02* (2013.01)

(56) References Cited

U.S. PATENT DOCUMENTS

| | | | | |
|---|---|---|---|---|
| 11,089,581 | B2* | 8/2021 | Åstrom | H04W 72/048 |
| 2016/0099763 | A1* | 4/2016 | Chen | H04W 56/0045 370/329 |
| 2019/0053227 | A1* | 2/2019 | Huang | H04L 25/03006 |
| 2019/0166581 | A1* | 5/2019 | Lien | H04B 7/0452 |
| 2019/0253904 | A1 | 8/2019 | Tsai et al. | |
| 2019/0254120 | A1* | 8/2019 | Zhang | H04W 24/08 |
| 2019/0260445 | A1* | 8/2019 | John Wilson | H04B 7/086 |
| 2019/0297648 | A1* | 9/2019 | Nagaraja | H04B 17/336 |
| 2019/0335430 | A1* | 10/2019 | Ljung | H04W 72/042 |
| 2019/0356399 | A1* | 11/2019 | John Wilson | H04B 7/088 |
| 2019/0356524 | A1 | 11/2019 | Yi et al. | |
| 2019/0373450 | A1* | 12/2019 | Zhou | H04W 48/12 |
| 2020/0045569 | A1* | 2/2020 | Seo | H04B 7/0695 |
| 2020/0045715 | A1* | 2/2020 | Li | H04W 72/1263 |
| 2020/0052844 | A1* | 2/2020 | Yu | H04W 72/048 |
| 2020/0205142 | A1* | 6/2020 | Gao | H04L 5/0048 |
| 2021/0289377 | A1* | 9/2021 | Seo | H04L 5/0053 |

FOREIGN PATENT DOCUMENTS

| | | |
|---|---|---|
| WO | WO-2018106043 A1 | 6/2018 |
| WO | WO-2019193581 A2 | 10/2019 |
| WO | WO-2019216640 A1 | 11/2019 |

OTHER PUBLICATIONS

International Search Report and Written Opinion—PCT/US2020/012951—ISA/EPO—dated Apr. 17, 2020.

Mediatek Inc: "Discussions on Search Space and CORESET Designs", 3GPP TSG RAN WG1 Meeting #90bis, 3GPP Draft, R1-1718323, Discussions on Search Space and CORESET Designs_Final, 3rd Generation Partnership Project (3GPP), Mobile Competence Centre; 650, Route Des Lucioles; F-06921 Sophia-Antipolis Cedex, vol. Ran WG1, No. Prague, CZ; Oct. 9, 2017-Oct. 13, 2017, Oct. 8, 2017 (Oct. 8, 2017), 11 Pages, XP051341506, Retrieved from the Internet: URL: http://www.3gpp.org/ftp/Meetings_3GPP_SYNC/RAN1/Docs/ [retrieved on Oct. 8, 2017] Section 2.1, par. 1-4, Section 2.2, Section 3.3, the whole document.

* cited by examiner

SYNCHRONIZATION SIGNAL BLOCK AND PHYSICAL DOWNLINK CONTROL CHANNEL SEARCH SPACE MONITORING BASED ON USER EQUIPMENT BEAMFORMING CAPABILITY

CROSS REFERENCE

The present Application for Patent claims the benefit of U.S. Provisional Patent Application No. 62/791,675 by ISLAM et al., entitled "SYNCHRONIZATION SIGNAL BLOCK AND PHYSICAL DOWNLINK CONTROL CHANNEL SEARCH SPACE MONITORING BASED ON USER EQUIPMENT BEAMFORMING CAPABILITY," filed Jan. 11, 2019, assigned to the assignee hereof, and which is expressly incorporated by reference herein.

BACKGROUND

The following relates generally to wireless communication, and more specifically to synchronization signal block (SSB) and physical downlink control channel (PDCCH) search space monitoring based on user equipment (UE) beamforming capability.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some examples of a wireless communications system, a base station may communicate via highly directional waves (e.g., beams). A base station may send downlink transmissions via one or more transmit beams, and a UE may receive the one or more downlink transmissions via one or more receive beams. The base station may transmit, and the UE may receive, control channel transmissions via a PDCCH. Control information may be included in one or more control resource sets (CORESETs). The CORESETs may include multiple resource blocks in the frequency domain, and may include n OFDM symbols in the time domain (where n is an integer). The CORESETs may include a total set of resources allocated for control information. The UE may be configured to monitor one or more search spaces to receive one or more CORESETs. However, conventional techniques for monitoring for CORESETs may be deficient.

SUMMARY

The described techniques relate to improved methods, systems, devices, and apparatuses that support synchronization signal block (SSB) and physical downlink control channel (PDCCH) search space monitoring based on user equipment (UE) beamforming capability. Generally, a user equipment may transmit, to a base station, a report indicating a beamforming capability of the UE. The beamforming capability report may indicate, for example, a number of receive beams the UE is capable of simultaneously generating during a particular monitoring occasion (e.g., slot). The base station may transmit to the UE a configuration for multiple control resource sets (CORESETs) based on the report. Each CORESET may correspond to a search space that the UE may monitor for one or more control channel transmissions in one or more of the multiple CORESETs, SSBs, channel state information reference signals (CSI-RSs), or the like.

In some instances, multiple CORESETs may occur within the same monitoring occasion (e.g., within the same slot), and the UE's beamforming capability may be able to generate a defined number of receive beams (e.g., N beams) that may be less than the number of CORESETs (e.g., M CORESETs) occurring within that monitoring occasion (e.g., where N<M). The UE may select a number of the multiple CORESETs to monitor within that monitoring occasion (e.g., select up to N CORESETs, none of which have a spatial quasi co-location relationship), allocate a respective receive beam to one of the CORESETs up to the number of supported receive beams, and may simultaneously monitor the selected number of CORESETs during that monitoring occasion using the respective receive beams.

In some examples, the UE may use quasi co-location relationships to select a greater number of CORESETs to monitor during the same monitoring occasion than the number of receive beams the UE is capable of simultaneously supporting. In an example, one or more unselected CORESETs occurring within that same monitoring occasion may have a spatial quasi co-location relationship with one of the CORESETs selected for monitoring. The UE may also monitor, within that same monitoring occasion, at least one of the one or more unselected CORESETs that have a spatial quasi co-location relationship with one of the selected CORESETs.

In some examples, the UE may use quasi co-location relationships to monitor one or more SSBs or one or more CSI-RSs that also occur during the same monitoring occasion. In an example, one or more SSBs or one or more CSI-RSs occurring within that same monitoring occasion may have a spatial quasi co-location relationship with one of the CORESETs selected for monitoring. The UE may monitor, within that same monitoring occasion, at least one of the one or more one or more SSBs or one or more CSI-RSs that have a spatial quasi co-location relationship with one of the selected CORESETs.

Using the techniques described herein, the UE may simultaneously monitor, during a same monitoring occasion, a number of CORESETs based on the beamforming capability of the UE, and/or any SSBs or CSI-RSs that are quasi co-located with one of the selected number of CORESETs.

A method of wireless communications at a UE is described. The method may include transmitting, to a base station, a report indicating a beamforming capability of the UE, receiving, from the base station, a configuration for a set of CORESETs based on the report, selecting, based on the beamforming capability, a number of the set of CORESETs to monitor during a monitoring occasion (e.g., select multiple CORESETs to monitor), and monitoring the selected number of CORESETs during the monitoring occasion.

An apparatus for wireless communications at a UE is described. The apparatus may include a processor, memory in electronic communication with the processor, and instructions stored in the memory. The instructions may be executable by the processor to cause the apparatus to transmit, to a base station, a report indicating a beamforming capability of the UE, receive, from the base station, a configuration for a set of CORESETs based on the report, select, based on the beamforming capability, a number of the set of CORESETs to monitor during a monitoring occasion (e.g., select multiple CORESETs to monitor), and monitor the selected number of CORESETs during the monitoring occasion.

Another apparatus for wireless communications at a UE is described. The apparatus may include means for transmitting, to a base station, a report indicating a beamforming capability of the UE, receiving, from the base station, a configuration for a set of CORESETs based on the report, selecting, based on the beamforming capability, a number of the set of CORESETs to monitor during a monitoring occasion (e.g., select multiple CORESETs to monitor), and monitoring the selected number of CORESETs during the monitoring occasion.

A non-transitory computer-readable medium storing code for wireless communications at a UE is described. The code may include instructions executable by a processor to transmit, to a base station, a report indicating a beamforming capability of the UE, receive, from the base station, a configuration for a set of CORESETs based on the report, select, based on the beamforming capability, a number of the set of CORESETs to monitor during a monitoring occasion (e.g., select multiple CORESETs to monitor), and monitor the selected number of CORESETs during the monitoring occasion.

In some examples of the method, apparatuses, and non-transitory computer-readable medium described herein, selecting the number of the set of CORESETs to monitor further may include operations, features, means, or instructions for selecting, based on the beamforming capability, the number of the set of CORESETs to monitor in which at least two of the set of CORESETs overlap during the monitoring occasion.

In some examples of the method, apparatuses, and non-transitory computer-readable medium described herein, respective demodulation reference signals (DMRSs) of the at least two of the set of CORESETs that overlap during the monitoring occasion may be not spatially quasi co-located.

In some examples of the method, apparatuses, and non-transitory computer-readable medium described herein, selecting the number of the set of CORESETs to monitor further may include operations, features, means, or instructions for selecting, based on the beamforming capability, the number of the set of CORESETs to monitor in which at least one of the set of CORESETs overlaps with at least one SSB or CSI-RS during the monitoring occasion.

In some examples of the method, apparatuses, and non-transitory computer-readable medium described herein, selecting the number of the set of CORESETs to monitor further may include operations, features, means, or instructions for selecting, based on the beamforming capability, the number of the set of CORESETs to monitor based on a number of simultaneous beams the beamforming capability indicates that the UE supports.

In some examples of the method, apparatuses, and non-transitory computer-readable medium described herein, selecting the number of the set of CORESETs to monitor further may include operations, features, means, or instructions for selecting the number of the set of CORESETs to monitor based on one or more quasi co-location relationships between respective pairs of the set CORESETs.

In some examples of the method, apparatuses, and non-transitory computer-readable medium described herein, selecting the number of the set of CORESETs to monitor further may include operations, features, means, or instructions for selecting the number of the set of CORESETs to monitor based on one or more quasi co-location relationships between respective pairs of synchronization signal blocks SSBs or CSI-RSs.

In some examples of the method, apparatuses, and non-transitory computer-readable medium described herein, selecting the number of the set of CORESETs to monitor further may include operations, features, means, or instructions for selecting a subset of the set of CORESETs that occur during the monitoring occasion based on the beamforming capability, and identifying, based on the configuration, a quasi co-location relationship between a first CORESET within the subset and a second CORESET that may be not included within the subset, where the first CORESET and the second CORESET may be included within the selected number of CORESETs.

In some examples of the method, apparatuses, and non-transitory computer-readable medium described herein, monitoring the selected number of CORESETs during the monitoring occasion further may include operations, features, means, or instructions for monitoring the first CORESET and the second CORESET during the monitoring occasion.

In some examples of the method, apparatuses, and non-transitory computer-readable medium described herein, selecting the number of the set of CORESETs to monitor further may include operations, features, means, or instructions for identifying, based on the configuration for the set of CORESETs, a second subset of the set of CORESETs that does not may have a quasi co-location relationship with any CORESET within the subset.

In some examples of the method, apparatuses, and non-transitory computer-readable medium described herein, selecting the subset of the set of CORESETs further may include operations, features, means, or instructions for selecting the subset of the set of CORESETs based on a respective index assigned to each CORESET of the set of CORESETs and the beamforming capability.

In some examples of the method, apparatuses, and non-transitory computer-readable medium described herein, selecting the subset of the set of CORESETs further may include operations, features, means, or instructions for selecting one or more CORESETs to include in the subset up to a number of simultaneous beams the beamforming capability indicates that the UE supports.

In some examples of the method, apparatuses, and non-transitory computer-readable medium described herein, the selecting further may include operations, features, means, or instructions for selecting the number of the set of CORESETs to monitor based on a number of SSBs or CSI-RSs that occur during the monitoring occasion.

In some examples of the method, apparatuses, and non-transitory computer-readable medium described herein, the selecting further may include operations, features, means, or instructions for selecting a subset of the number of SSBs to monitor during the monitoring occasion based on the beamforming capability, and identifying, based on the configuration for the set of CORESETs, a quasi co-location relationship between a first SSB within the subset and a second SSB that may be not included within the subset, where the monitoring further includes monitoring the first SSB and the second SSB during the monitoring occasion.

In some examples of the method, apparatuses, and non-transitory computer-readable medium described herein, the selected number of set of CORESETs includes a single CORESET, where the monitoring further includes monitoring the single CORESET and at least one SSB or CSI-RS during the monitoring occasion.

Some examples of the method, apparatuses, and non-transitory computer-readable medium described herein may further include operations, features, means, or instructions for selecting, based on the beamforming capability, a second number of the set of CORESETs to monitor during a second monitoring occasion, and monitoring the selected second number of CORESETs during the second monitoring occasion.

In some examples of the method, apparatuses, and non-transitory computer-readable medium described herein, the monitoring may include operations, features, means, or instructions for monitoring a respective search space corresponding to each CORESET of the selected number of CORESETs during the monitoring occasion.

In some examples of the method, apparatuses, and non-transitory computer-readable medium described herein, the monitoring further may include operations, features, means, or instructions for receiving a demodulation reference signal within a control channel candidate corresponding to a first CORESET of the selected number of CORESETs, and decoding a control channel of the first CORESET corresponding to the control channel candidate based on the demodulation reference signal.

In some examples of the method, apparatuses, and non-transitory computer-readable medium described herein, the report indicates a number of receive chains at the UE.

In some examples of the method, apparatuses, and non-transitory computer-readable medium described herein, the report indicates a number of simultaneous receive beams the UE may be capable of generating.

In some examples of the method, apparatuses, and non-transitory computer-readable medium described herein, the report indicates a number of reference signals that may be not spatially quasi co-located with respect to receive beamforming with each other that the UE may be capable of simultaneously monitoring.

In some examples of the method, apparatuses, and non-transitory computer-readable medium described herein, the threshold may be configured through one or more of DCI, media access control channel element (MAC-CE), and radio resource control (RRC) signaling.

In some examples of the method, apparatuses, and non-transitory computer-readable medium described herein, the report indicates a threshold received signal strength, and where the UE may be capable of simultaneously monitoring when the threshold may be satisfied.

Some examples of the method, apparatuses, and non-transitory computer-readable medium described herein may further include operations, features, means, or instructions for identifying a respective periodicity of each of the set of CORESETs based on the configuration.

A method of wireless communications at a base station is described. The method may include receiving, from a UE, a report indicating a beamforming capability of the UE, transmitting a configuration for a set of CORESETs based on the report, selecting, based on the beamforming capability, a number of the set of CORESETs in which to send a control channel transmission during a monitoring occasion (e.g., select multiple CORESETs), and transmitting at least one control channel transmission during the monitoring occasion based on the selected number of CORESETs.

An apparatus for wireless communications at a base station is described. The apparatus may include a processor, memory in electronic communication with the processor, and instructions stored in the memory. The instructions may be executable by the processor to cause the apparatus to receive, from a UE, a report indicating a beamforming capability of the UE, transmit a configuration for a set of CORESETs based on the report, select, based on the beamforming capability, a number of the set of CORESETs in which to send a control channel transmission during a monitoring occasion (e.g., select multiple CORESETs), and transmit at least one control channel transmission during the monitoring occasion based on the selected number of CORESETs.

Another apparatus for wireless communications at a base station is described. The apparatus may include means for receiving, from a UE, a report indicating a beamforming capability of the UE, transmitting a configuration for a set of CORESETs based on the report, selecting, based on the beamforming capability, a number of the set of CORESETs in which to send a control channel transmission during a monitoring occasion (e.g., select multiple CORESETs), and transmitting at least one control channel transmission during the monitoring occasion based on the selected number of CORESETs.

A non-transitory computer-readable medium storing code for wireless communications at a base station is described. The code may include instructions executable by a processor to receive, from a UE, a report indicating a beamforming capability of the UE, transmit a configuration for a set of CORESETs based on the report, select, based on the beamforming capability, a number of the set of CORESETs in which to send a control channel transmission during a monitoring occasion (e.g., select multiple CORESETs), and transmit at least one control channel transmission during the monitoring occasion based on the selected number of CORESETs.

In some examples of the method, apparatuses, and non-transitory computer-readable medium described herein, selecting the number of the set of CORESETs further may include operations, features, means, or instructions for selecting, based on the beamforming capability, the number of the set of CORESETs in which at least two of the set of CORESETs overlap during the monitoring occasion.

In some examples of the method, apparatuses, and non-transitory computer-readable medium described herein, respective DMRSs of the at least two of the set of CORESETs that overlap during the monitoring occasion may be not spatially quasi co-located.

In some examples of the method, apparatuses, and non-transitory computer-readable medium described herein, selecting the number of the set of CORESETs further may include operations, features, means, or instructions for selecting, based on the beamforming capability, the number of the set of CORESETs in which at least one of the set of CORESETs overlaps with at least one SSB or CSI-RS during the monitoring occasion.

In some examples of the method, apparatuses, and non-transitory computer-readable medium described herein, selecting the number of the set of CORESETs further may include operations, features, means, or instructions for selecting, based on the beamforming capability, the number of the set of CORESETs based on a number of simultaneous beams the beamforming capability indicates that the UE supports.

In some examples of the method, apparatuses, and non-transitory computer-readable medium described herein, selecting the number of the set of CORESETs further may include operations, features, means, or instructions for selecting the number of the set of CORESETs based on one or more quasi co-location relationships between respective pairs of the set CORESETs.

In some examples of the method, apparatuses, and non-transitory computer-readable medium described herein, selecting the number of the set of CORESETs further may include operations, features, means, or instructions for selecting the number of the set of CORESETs based on one or more quasi co-location relationships between respective pairs of SSBs or CSI-RSs.

In some examples of the method, apparatuses, and non-transitory computer-readable medium described herein, selecting the number of the set of CORESETs further may include operations, features, means, or instructions for selecting a subset of the set of CORESETs that occur during the monitoring occasion based on the beamforming capability, and identifying, based on the configuration, a quasi co-location relationship between a first CORESET within the subset and a second CORESET that may be not included within the subset, where the first CORESET and the second CORESET may be included within the selected number of CORESETs.

In some examples of the method, apparatuses, and non-transitory computer-readable medium described herein, transmitting the at least one control channel transmission during the monitoring occasion further may include operations, features, means, or instructions for transmitting at least one control transmission during the first CORESET and at least one control transmission during the second CORESET during the monitoring occasion.

In some examples of the method, apparatuses, and non-transitory computer-readable medium described herein, selecting the number of the set of CORESETs further may include operations, features, means, or instructions for identifying, based on the configuration for the set of CORESETs, a second subset of the set of CORESETs that does not may have a quasi co-location relationship with any CORESET within the subset.

In some examples of the method, apparatuses, and non-transitory computer-readable medium described herein, selecting the subset of the set of CORESETs further may include operations, features, means, or instructions for selecting the subset of the set of CORESETs based on a respective index assigned to each CORESET of the set of CORESETs and the beamforming capability.

In some examples of the method, apparatuses, and non-transitory computer-readable medium described herein, selecting the subset of the set of CORESETs further may include operations, features, means, or instructions for selecting one or more CORESETs to include in the subset up to a number of simultaneous beams the beamforming capability indicates that the UE supports.

In some examples of the method, apparatuses, and non-transitory computer-readable medium described herein, selecting the number of the set of CORESETs further may include operations, features, means, or instructions for selecting the number of the set of CORESETs based on a number of SSBs or CSI-RSs that occur during the monitoring occasion.

In some examples of the method, apparatuses, and non-transitory computer-readable medium described herein, selecting the number of the set of CORESETs further may include operations, features, means, or instructions for identifying a subset of the number of SSBs that occur during the monitoring occasion based on the beamforming capability, and identifying, based on the configuration for the set of CORESETs, a quasi co-location relationship between a first SSB within the subset and a second SSB that may be not included within the subset, where the first SSB and the second SSB occur during the monitoring occasion.

In some examples of the method, apparatuses, and non-transitory computer-readable medium described herein, the selected number of set of CORESETs includes a single CORESET, where the single CORESET and at least one SSB or CSI-RS occur during the monitoring occasion.

Some examples of the method, apparatuses, and non-transitory computer-readable medium described herein may further include operations, features, means, or instructions for selecting, based on the beamforming capability, a second number of the set of CORESETs in which to send a control channel transmission during a second monitoring occasion, and transmitting at least a second control channel transmission during the second monitoring occasion based on the second number of the set of CORESETs.

In some examples of the method, apparatuses, and non-transitory computer-readable medium described herein, the transmitting further may include operations, features, means, or instructions for transmitting a demodulation reference signal within a control channel candidate corresponding to a first CORESET of the selected number of CORESETs.

In some examples of the method, apparatuses, and non-transitory computer-readable medium described herein, the report indicates a number of receive chains at the UE.

In some examples of the method, apparatuses, and non-transitory computer-readable medium described herein, the report indicates a number of simultaneous receive beams the UE may be capable of generating.

In some examples of the method, apparatuses, and non-transitory computer-readable medium described herein, the report indicates a threshold received signal strength, and where the report further indicates that the UE may be capable of simultaneously monitoring when the threshold may be satisfied.

In some examples of the method, apparatuses, and non-transitory computer-readable medium described herein, the threshold may be configured through one or more of DCI, MAC-CE, and RRC signaling.

In some examples of the method, apparatuses, and non-transitory computer-readable medium described herein, the report indicates a number of reference signals that may be not spatially quasi co-located with respect to receive beamforming with each other that the UE may be capable of simultaneously monitoring.

Some examples of the method, apparatuses, and non-transitory computer-readable medium described herein may further include operations, features, means, or instructions for indicating, in the configuration, a respective periodicity of each of the set of CORESETs.

DETAILED DESCRIPTION

Figure 1:
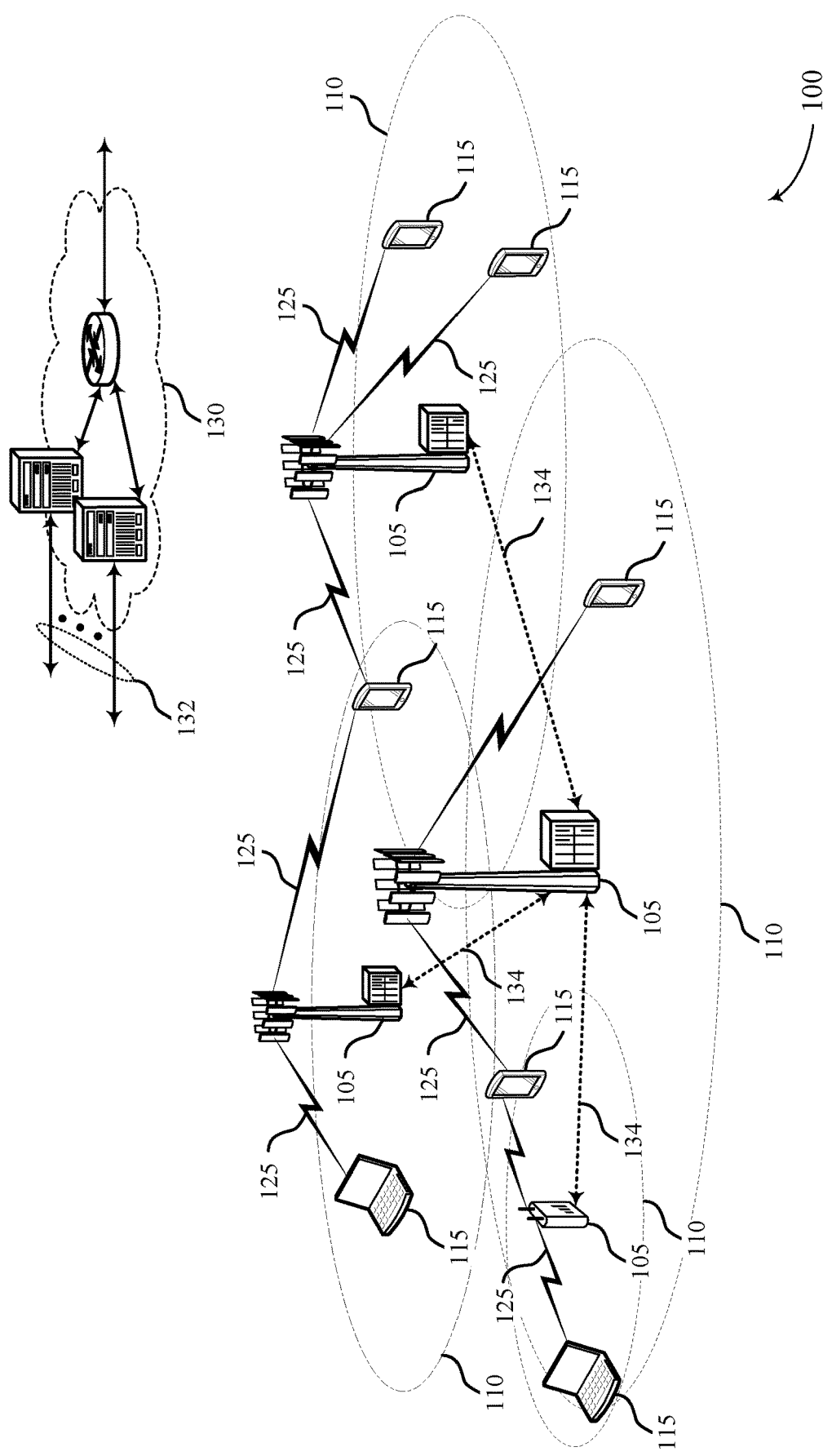
FIG. 1 illustrates an example of a system for wireless communications in accordance with aspects of the present disclosure.

In some examples of a wireless communication system, a user equipment (UE) may be in communication with a base station, and may monitor one or more search spaces for downlink signaling. For example, the UE may monitor for physical downlink control channels (PDCCHs), control resource sets (CORESETs), synchronization signal blocks (SSBs), or the like. Such monitoring may be based on the assumption that a receiving UE is constrained by analog beamforming. That is, a receiving UE may be constrained by analog beamforming capabilities such that the UE is capable of receiving multiple signals that have the same spatial parameters (e.g., are quasi co-located) on one search space, or receiving one beam at a time in non-overlapping search spaces if the beams are not quasi co-located. In some examples, multiple search spaces for PDCCH, CORESETS, SSBs, or the like, may overlap in time, and at least some of the overlapping search spaces may not be spatially quasi co-located. In some cases, DMRSs corresponding to respective CORESETs that overlap within a particular monitoring occasion may not be spatially quasi co-located. In such examples, a UE constrained by analog beamforming capabilities may monitor one of the overlapping search spaces. Such limitations may be inefficient in that they may require a network to separate the multiple search spaces in time, leading to high overhead.

In some examples of a wireless communications system described herein, a UE may have hybrid or digital receive beamforming capability. That is, the UE may have multiple receive chains or front ends, and may be able to simultaneously generate multiple receive beams. The UE may thus be capable of monitoring multiple beams (e.g., monitoring multiple search spaces to receive multiple signals received via different receive beams) at the same time, even if the multiple signals do not have the same spatial receive parameters (e.g., are not spatially quasi co-located). In some examples, the UE may also be capable of receiving more than one signal using a single receive beam, if the more than one signals are quasi co-located. For example, the UE may also be capable of adjusting or weighting its receive antennas to receive multiple signals, CORESETs, or the like.

Two signals may be considered to have a spatial quasi co-location relationship if a device, such as a UE, is able to receive a first signal, and estimate the properties of a second signal based on the properties of the first signal. If multiple signals, CORESETS, transmit beams, or the like, share spatial parameters, (e.g., are quasi co-located), then the UE may be capable of simultaneously receiving each of them using the same receive beam. In such examples, a UE that has hybrid or digital receive beamforming capability may be able to receive multiple signals that are not quasi co-located on multiple different receive beams, and may further be able to receive additional signals that are quasi co-located with any of the multiple receive beams.

In an example, a UE may convey its beamforming capability to a base station. The beamforming capability may indicate a number of receive chains or front ends, a number of receive beams that the UE is capable of generating simultaneously, a number of beams that are not quasi co-located that the UE is capable of monitoring simultaneously, or the like.

The base station may send configuration information to the UE, including scheduling information for downlink transmissions (e.g., control channel transmissions, SSBs, channel state information reference signals (CSI-RSs), or the like) according to the UE beamforming capability. For example, the base station may send configuration information indicating a periodicity of one or more CORESETs on which the base station may send downlink control channel transmissions. In any given monitoring occasion (e.g., a slot, mini-slot, or other transmission time interval (TTI)), the UE may monitor one or more search spaces to receive control information or SSBs, in accordance with its capability.

In some cases, a UE may simultaneously monitor for two or more CORESETs, signals, beams, or the like, that do not have a quasi co-location relationship. For example, the UE may indicate to a base station that the UE is capable of supporting multiple receive beams to simultaneously monitor two or more CORESETs, signals, beams, or the like, that do not have a quasi co-location relationship. The base station may configure the UE with multiple CORESETs having different periodicities that, at times, may overlap. Based on knowledge of the UEs capabilities, the base station may transmit multiple simultaneous transmissions in multiple different CORESETs that do not have a quasi co-location relationship, to the UE during a particular monitoring occasion. However, because the UE is capable of supporting the multiple receive beams, the UE may select how many CORESETs it can monitor during a particular monitoring occasion based on the periodicities, and utilize the respective receive beams to simultaneously receive the simultaneous transmission during the monitoring occasion.

Further the UE may identify additional unselected CORESETs it can simultaneously monitor with the selected CORESETs based on a quasi co-location relationship (e.g., a spatial quasi co-location relationship). That is, an unselected CORESET may have a quasi co-location relationship with a selected CORESET. The quasi co-location relationship between the selected CORESET and the unselected CORESET may be identified based on configuration information received from the base station. The UE may determine that an unselected CORESET having a quasi co-location relationship with a selected CORESET, and may simultaneously monitor the unselected CORESET with the selected CORESET, and may receive another simultaneous transmission during the same monitoring occasion.

In some examples, the UE may also identify one or more SSBs or CSI-RSs that are scheduled for the same monitoring occasion as the selected CORESETs. The UE may determine that an SSB or CSI-RS has a quasi co-location relationship with a selected CORESET. In such examples, the UE may simultaneously monitor the SSB or CSI-RS with the selected CORESETs, and may receive a synchronization signal simultaneously with the control channel transmissions in the selected CORESETs during the same monitoring occasion.

Particular aspects of the subject matter described herein may be implemented to realize one or more advantages. The described techniques may support improvements in monitoring for CORESETs, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. Aspects of the disclosure are further illustrated by and described with reference to timelines, and process flows. Aspects of the disclosure are further illustrated by and described with reference to apparatus diagrams, system diagrams, and flowcharts that relate to synchronization signal block and physical downlink control channel search space monitoring based on user equipment beamforming capability.

FIG. 1 illustrates an example of a wireless communications system 100 that supports synchronization signal block and physical downlink control channel search space monitoring based on user equipment beamforming capability in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, such as in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may contain one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may contain one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, signals, CORESETS, beams, or the like, may share spatial parameters such that a receiving UE 115 can estimate the properties of one signal based on the properties of a second signal. For example, if a first signal and a second signal are quasi co-located (e.g., type A quasi co-location) then a receiving UE 115 may estimate one or more of Doppler shift, Doppler spread, average delay, delay spread, or the like, for one quasi co-located signal based on the same properties of another quasi co-located signal. Similarly, for type B quasi co-location, a UE 115 may estimate properties such as Doppler shift or Doppler spread for a signal based on the same properties of another quasi co-located signal. For type C Quasi co-location, a UE 115 may estimate Doppler shift and average delay for a signal based on the same properties of another quasi co-located signal. For type D quasi co-location, a UE 115 may estimate the spatial receive parameters of a first signal based on the same parameters of a spatially quasi co-located signal.

For example, the UE 115 may be configured with a list of up to M transmission configuration indication (TCI) state configurations within a higher layer parameter physical downlink shared channel (PDSCH)-Config to decode PDSCH according to a detected PDCCH with downlink control information (DCI) intended for the UE 115 and the given serving cell, where M depends on the UE capability. Each TCI State may contain parameters for configuring a quasi co-location (QCL) relationship between one or two downlink reference signals and the DMRS port group of the PDSCH. The quasi co-location relationship is configured by the higher layer parameter qcl-Type1 for the first downlink reference signal, and qcl-Type2 for the second downlink reference signal (if configured). For the case of two downlink reference signals, the quasi co-location types may not be the same, regardless of whether the references are to the same downlink reference signal or different downlink reference signals. The quasi co-location types corresponding to each downlink reference signal is given by the higher layer parameter qcl-Type in QCL-Info and may take one of the following values: QCL-TypeA: {Doppler shift, Doppler spread, average delay, delay spread}; QCL-TypeB: {Doppler shift, Doppler spread}; QCL-TypeC: {Doppler shift, average delay}; QCL-TypeD: {Spatial Rx parameter}.

In some examples, a UE 115 may receive a set of one or more transmitted SSBs. If an SSB overlaps in time with any other PDCCH, then the UE 115 may not be required to monitor that PDCCH candidate. In some examples, if a PDCCH monitoring occasion overlaps with one or more SSBs, the UE 115 may not be required to monitor the PDCCH locations unless the PDCCH locations correspond to remaining minimum system information (RMSI) monitoring occasions. That is, a network may expect the UE 115 to monitor SSBs (e.g., for channel or beam measurement). However, if the PDCCH is not quasi co-located with respect to the SSB, then the UE 115 may not be expected to monitor both the PDCCH and the SSB. For example, for single cell operation or for operation with carrier aggregation in a same frequency band, a UE 115 may not expect to monitor a PDCCH in a type0/0A/2/3-PDCCH common search space (CSS)) set or in a UE-specific search space (USS) set if a DMRS for monitoring a PDCCH in a Type1-PDCCH CSS set does not have same quasi co-location TypeD properties with a DMRS for monitoring the PDCCH in the Type0/0A/2/3-PDCCH in the Type0/0A/2/3-PDCCH CSS set or in the USS set, and if the PDCCH or an associated PDSCH overlaps in at least one symbol with a PDCCH the UE monitors in a Type1-PDCCH CSS set or with an associated PDSCH.

When a UE 115 transmits a random access channel (RACH) message, then the UE 115 may monitor for a PDCCH signal. If other physical uplink control channel (PUCCH) signals are transmitted during the same monitoring occasion, then the UE 115 may not monitor for the other PUCCH signals. For example, for single cell operation or for operation with carrier aggregation in a same frequency band, a UE 115 does not expect to monitor a PDCCH in a type0/0A/2/3-PDCCH CSS set or in a USS set if a DMRS for monitoring a PDCCH in a Type1-PDCCH CSS set does not have same quasi co-location-TypeD properties with a DMRS for monitoring the PDCCH in the Type0/0A/2/3-PDCCH CSS set or in the USS set, and if the PDCCH or an associated PDSCH overlaps in at least one symbol with a PDCCH the UE monitors in a Type1-PDCCH CSS set or with an associated PDSCH.

In some examples, multiple CORESETs may overlap in the time domain. In such examples, a UE 115 may apply a rule (e.g., select the lowest UE specific search set index) and use the rule to determine which UE specific search space in which to monitor for PDCCH. If multiple common search spaces collide, the UE 115 may monitor the search space with the lowest index values where the multiple common search spaces are not quasi co-located with respect to type D quasi co-location. For example, if a UE is configured for single cell operation or for operation with carrier aggregation in a same frequency band, and monitors PDCCH candidates in overlapping PDCCH monitoring occasions in multiple CORESETs that have different QCL-TypeD properties on active DL BWP(s) of one or more cells, then the UE monitors PDCCHs only in a CORESET, and in any other CORESET from the multiple CORESETs having same QCL-TYPED properties as the CORESET, on the active DL BWP of a cell with the lowest index from the one or more cells that corresponds to the CSS set with the lowest index, if any. Otherwise, to the USS set with the lowest index: the lowest USS index is determined over all USS sets with at least one PDCCH candidate in overlapping PDCCH monitoring occasions; for the purpose of determining the CORESET, a SS/PBCH block is considered to have different QCL-TypeD properties than a CSI-RS; for purposes of determining the CORESET, a first CSI-RS associated with a SS/PBCH block in a first cell and a second CSI-RS in a second cell that is also associated with the SS/PBCH block are assumed to have same QCL-TypeD properties; the allocation of non-overlapping CCEs and of PDCCH candidates for PDCCH monitoring is according to all search space sets associated with the multiple CORESETs on the active DL BWP(s) of the one or more cells; the number of active TCI states is determined from the multiple CORESETs.

Where two reference signals are quasi co-located with respect to Type D, the base station 105 may know which two reference signals the UE 115 can monitor simultaneously. In some examples, the two signals may be reflected through various paths, and may be received at the same or close to the same angle. The UE 115 may determine the quasi co-location relationship between signals or between beams, and may indicate to the base station 105 which signals the UE 115 can monitor simultaneously using a group based beam reporting feature. The UE 115 may identify subsets of reference signals that can be monitored by the UE 115 simultaneously, and the base station 105 may determine which search spaces can overlap, and which SSBs can overlap with search spaces, etc. For example, for L1-RSRP computation, the UE 115 may be configured with CSI-RS resources, SS/PBCH Block resources or both CSI-RS and SS/PBCH block resources, when resource wise quasi co-location with QCL-Type A and QCL-Type D. The UE 115 may be configured with CSI-RS resource setting up to 16 CS-RS resource sets having yup to 64 resources within each set. The total number of different CSI-RS resources over all resource sets is no more than 128. For L1-RSRP reporting, if the higher layer parameter nrofReportedRS in CSI-ReportConfig, is configured to be one, the reported L1-RSRP value is defined by a 7-bit value in the range [−140, −44] dBm with 1 dB step size, if the higher layer parameter nrofReportedRS is configured to be larger than one, or if the higher layer parameter groupBasedBeamReporting is configured as 'enabled' the UE may use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is defined in a standard or specification.

In some examples, the UE may convey the indices of reference signals that it can monitor simultaneously using 'groupBasedBeamReporting' feature. This allows network to overlap the PDCCH search space monitoring occasions of those reference signals and network knows that UE can monitor both those PDCCH search spaces. The network may have to transmit N number of reference signals and UE may have to identify and feedback different subsets within N that it can monitor simultaneously. Group based beam reporting procedures may facilitate UEs 115 with analog beamforming constraints. UEs 115 that only have one radio frequency (RF) front end may be able to simultaneously receive a limited number of reference signals.

The conventional procedures described herein rely on the assumption that receiving UEs 115 are constrained by analog beamforming (e.g., only have one front end and/or are only capable of generating a single receive beam). Such procedures may result in inefficiently high overhead, because a base station 105 may separate different search spaces to satisfy the analog beamforming constraints of receiving UEs 115. However, in some examples, such separation may be unnecessary or redundant if receiving UEs 115 have hybrid or digital beamforming capabilities. In such examples, a UE 115 may transmit, to a base station, a report indicating a beamforming capability of the UE 115, receive, from a base station, a configuration for a plurality of CORESETs based on the report, select a number (e.g., multiple CORESETs) of the plurality of CORESETs to monitor, and monitor the selected number of CORESETs during a monitoring occasion. In some examples, the UE 115 may also monitor one or more unselected CORESETs that have a spatial quasi co-location relationship (e.g., Type D) with one of the selected CORESETs.

Figure 2:
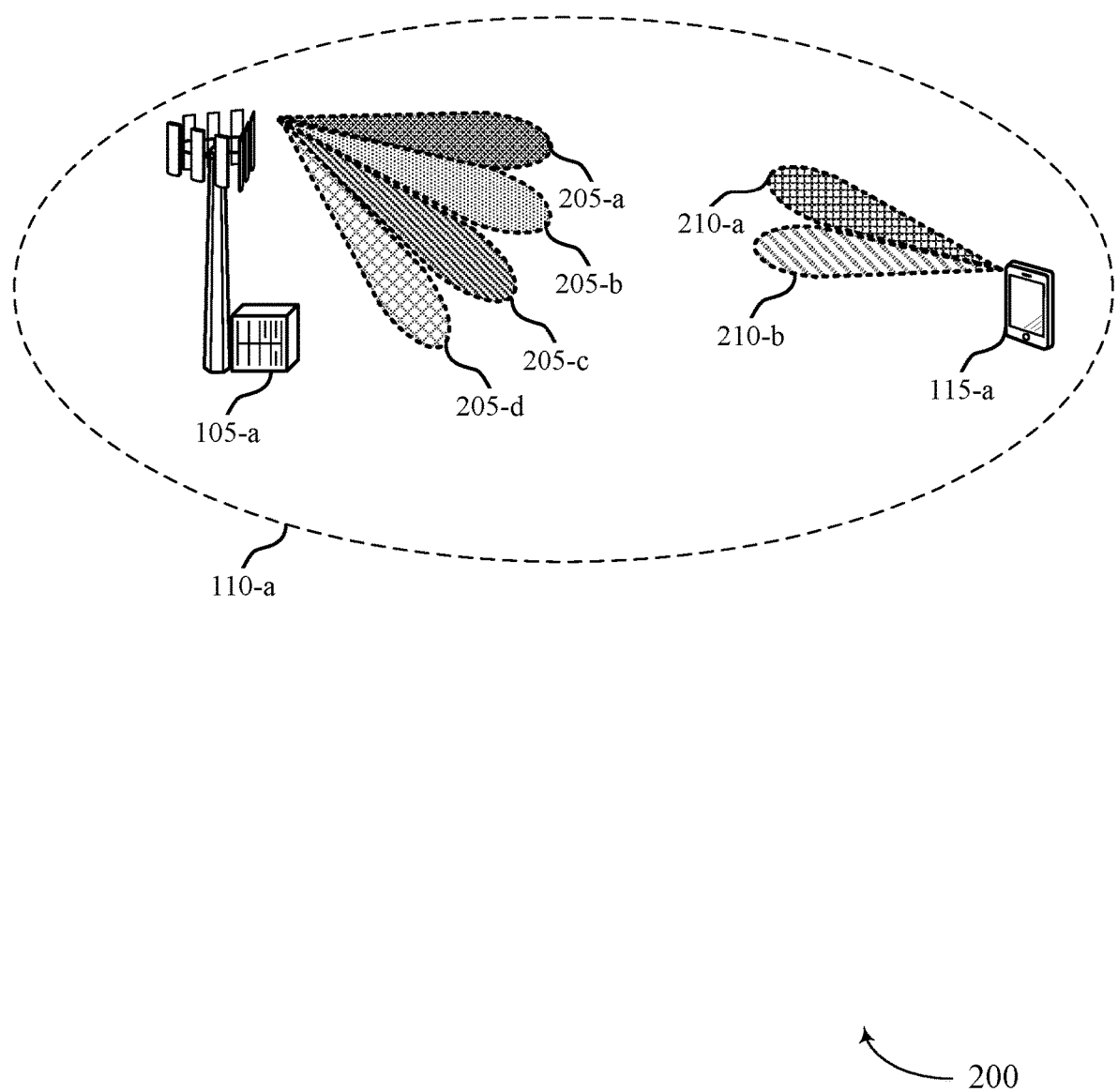
FIG. 2 illustrates an example of a wireless communications system in accordance with aspects of the present disclosure.

FIG. 2 illustrates an example of a wireless communications system 200 that supports synchronization signal block and physical downlink control channel search space monitoring based on user equipment beamforming capability in accordance with aspects of the present disclosure. In some examples, wireless communications system 200 may include a UE 115-a and a base station 105-a, which may be examples of corresponding devices described with respect to wireless communications system 100.

In some examples, base station 105-a may be in communication with UE 115-a. Base station 105-a may communicate with UEs 115 via multiple highly directional transmit beams 205. UE 115-a may receive signals from the base station 105-a via one or more highly directional receive beams 210. In some examples, downlink transmissions from base station 105-a may share spatial parameters (e.g., be quasi co-located), and thus a single receive beam generated by the UE 115-a in accordance with those spatial parameters may be able to simultaneously receive both of the downlink transmissions.

A UE 115-a may have hybrid or digital receive beamforming capability. UE 115-a may have multiple receive chains or front ends, and may be able to simultaneously generate multiple receive beams. UE 115-a may thus be capable of simultaneously monitoring multiple search spaces to receive multiple signals received via different receive beams 210-b during the same monitoring occasion, even if the multiple signals do not have the same spatial parameters (e.g., are not spatially quasi co-located). A search space may be, for example, a search space for a PDCCH candidate of a particular CORESET, and the UE 115-a may monitor multiple search spaces, and hence multiple PDCCH candidates, for a control channel transmission corresponding to a particular CORESET.

In some examples, UE 115-a may also be capable of receiving more than one signal using a single receive beam 210, if the more than one signals are spatially quasi co-located. For example, UE 115-a may also be capable of adjusting or weighting its receive antennas to receive multiple signals, CORESETs, beams, or the like, using the single receive beam 210.

In some examples, UE 115-a may support two receive beams 210 (e.g., receive beam 210-a and receive beam 210-b). For example, UE 115-a may have multiple receive chains or front ends, and may be able to simultaneously generate multiple receive beams 210-a and 210-b. In some examples, a number of RF front ends may be RF front ends in analog beamforming, and may be equal to the number of UE antennas in digital beamforming. In some examples, the number of RF front ends may be more than one but less than the number of UE 115 antennas in hybrid beamforming. UEs 115 that have two RF front ends may be capable of receiving any reference signals.

UE 115-a may be able to receive a first signal using one receive beam 210-a, and estimate the properties of the second signal based on the properties of the first signal. In such cases, the first and second signal may be considered to be spatially quasi co-located because the properties of one can be estimated from the properties of the other. If multiple signals, CORESETS, transmit beams, or the like, share spatial parameters, (e.g., are spatially quasi co-located), then UE 115-a may be capable of simultaneously receiving them using the same receive beam 210-a. The UE 115-a may transmit to base station 105-a a beamforming capability report indicating that the UE 115-a can support two or more receive beams (e.g., at least a first receive beam 210-a and a second receive beam 210-b).

Base station 105-a may receive the beamforming capability report from UE 115-a, and may schedule downlink transmissions accordingly. For example, based on the beamforming capability report received from the UE 115-a, base station 105-a may determine that UE 115-a is capable of simultaneously receiving multiple downlink transmissions during a monitoring occasion (e.g., during a same slot), even if the downlink signals are not spatially quasi co-located. Base station 105-a may schedule the transmission of two or more signals that overlap in time, and may send the two signals in resources corresponding to two or more separate PDCCH search spaces. Or, base station 105-a may send the two signals in an SSB or CSI-RS in a PDCCH search space. In such examples, the base station 105 may not need to ensure that the respective reference signals are spatially quasi co-located, based on the beamforming capability of receiving UE 115-a. The base station may schedule two separate signals (e.g., control channel transmissions, SSBs, CSI-RSs, and the like) that are not quasi co-located with each other during a single monitoring period, and may also schedule additionally schedule any other signals (e.g., control channel transmissions, SSBs, CSI-RSs, and the like) that are quasi co-located with either of the two non-quasi co-located signals.

Base station 105-a may send configuration information to UE 115-a, indicating periodicities for one or more CORESETs, one or more SSBs, and/or one or more CSI-RSs. In some examples, one or more of the CORESETs, one or more of the SSBs, and/or one or more CSI-RSs may overlap in time during a particular monitoring occasions. UE 115-a may select how many CORESETs to monitor in the monitoring occasion based on its capability. For instance, where UE 115-a is capable of generating two receive beams (e.g., receive beam 210-a and receive beam 210-b), UE 115-a may use both beams to monitor up to two CORESETs (e.g., a total of two CORESETs and SSBs), where neither of the two selected CORESETs have a QCL relationship.

UE 115-a may take advantage of any spatial quasi co-location relationships between additional CORESETs and selected CORESETs to select to monitor additional CORESETs during the monitoring occasion. For example, UE 115-a may select a first CORESET to monitor using receive beam 210-a during a monitoring occasion, and may select a second CORESET to simultaneously monitor using receive beam 210-b during the monitoring occasion. If an SSB, CSI-RS, or third CORESET is spatially quasi co-located with the first CORESET, then UE 115-a may also monitor the SSB, CSI-RS, or third CORESET using receive beam 210-a during the monitoring occasion.

Figure 3:
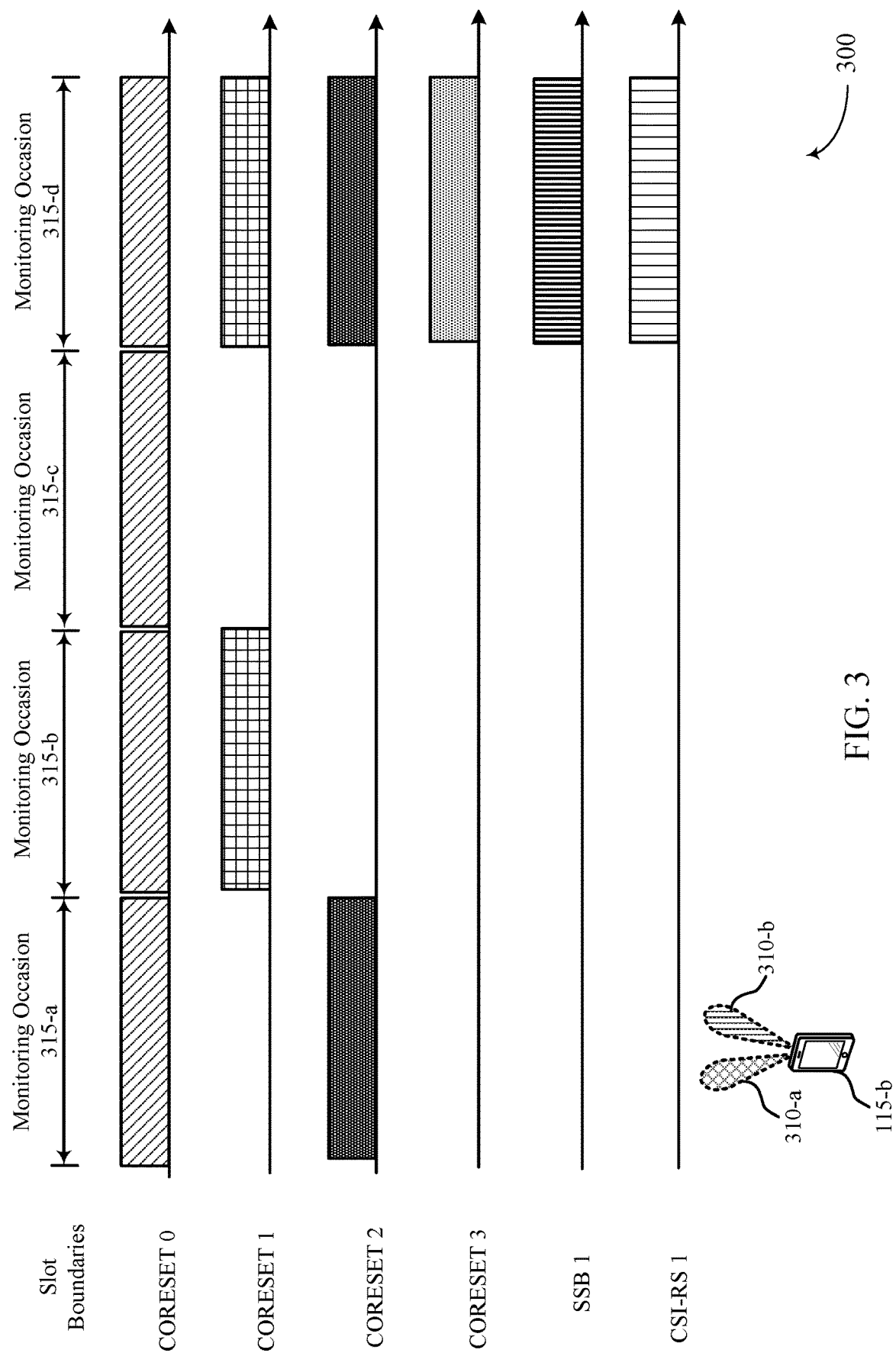
FIG. 3 illustrates an example of a timeline in accordance with aspects of the present disclosure.

When monitoring a selected CORESET during a monitoring occasion, UE 115-a may monitor a corresponding search space for a control channel transmission within the CORESET during the monitoring period. If UE 115-a can successfully decode the search space, then the search space includes a control channel transmission of that CORESET for UE 115-a. In each monitoring occasion, UE 115-a may select one or more CORESETs to monitor based on its beamforming capability and the received configuration information, and may simultaneously receive multiple scheduled downlink transmissions. FIG. 3 illustrates an example of search space monitoring across time.

FIG. 3 illustrates an example of a timeline 300 that supports synchronization signal block and physical downlink control channel search space monitoring based on user equipment beamforming capability in accordance with aspects of the present disclosure. In some examples, timeline 300 may be implemented by a UE 115-b, and a base station 105, which may be examples of corresponding devices described with respect to wireless communications system 100.

As illustrated and described with respect to FIG. 2, UE 115-b may have hybrid or digital receive beamforming capability. UE 115-b may have multiple receive chains or front ends, and may be able to simultaneously generate multiple receive beams 310 (e.g., receive beam 310-a and receive beam 310-b). UE 115-b may thus be capable of monitoring multiple search spaces to receive multiple signals received via different receive beams 310.

In some examples, UE 115-b may report its beamforming capabilities. For example, UE 115-b may send a report indicating that it has N receive chains and/or that it can simultaneously monitor N reference signals/beams and/or that it can simultaneously generate N receive beams. In some examples, UE 115-b may report that it can generate two (N=2) receive beams (e.g., receive beam 310-a and receive beam 310-b).

The base station 105 may schedule downlink transmissions and configure one or more CORESETs based on the beamforming capability report. Because of the beamforming capabilities of UE 115-b, base station 105 may be able to schedule simultaneous transmissions during the same monitoring occasions 315.

Base station 105 may then transmit configuration information to UE 115-b based on the reported beamforming capability. The configuration information may include information regarding periodicities for different CORESETS. In some instances, the periodicities may cause two or more of the CORESETs to overlap during one or more monitoring occasions 315. Additionally, in some examples, the CORESETs may partially or totally overlap with respect to frequency. In some examples, DMRSs corresponding to respective CORESETs that overlap within a particular monitoring occasion may not have a spatial quasi co-location relationship with each other (e.g., with respect to Type D). For example, first and second CORESETs may overlap in a particular monitoring occasion. A first DMRS for the first CORESET and a second DMRS for the second CORESET may, in some examples, not be quasi co-located with respect to Type D. One or more SSBs, CSI-RSs, or the like, may also be indicated in the configuration information, and may overlap with one or more CORESETs during a particular monitoring occasion.

In such examples, UE 115-b may select a number of CORESETs (e.g., multiple CORESETs) to monitor for downlink signals during each monitoring occasion 315. UE 115-b may monitor PDCCH search candidates in overlapping monitoring occasions 315 in multiple CORESETs that have different quasi co-location type D properties. For instance, the UE 115-b may monitor PDCCH in N (e.g., two or more) number of CORESETs, and in any other CORESET from the multiple CORESETs having the same quasi co-location type D properties as the N selected CORESETs. That is, UE 115-b may monitor multiple CORESETs, even if the CORESETs are not quasi co-located, within the same monitoring occasion 315. UE 115-a may also monitor additional CORESETs, SSBs, CSI-RSs, or the like, if they are quasi co-located with one of the selected CORESETs. UE 115-b may simultaneously receive one or more control channel transmissions, SSBs, CSI-RSs, or the like, based on the monitoring.

In a non-limiting illustrative example, UE 115-b may receive configuration information for multiple CORESETs based on the beamforming capability report. The configuration information may indicate an index value for each CORESET and/or one or more SSBs (e.g., CORESET 0, CORESET 1, CORESET 2, CORESET 3, and SSB 1). The configuration information may include the periodicity of the indicated CORESETs. For instance, CORESET 0 may have a periodicity of one slot, CORESET 1 may have a periodicity of two slots, CORESET 2 may have a periodicity of three slots, and CORESET 3 may have a periodicity of four slots. Thus, different CORESETs may overlap in different monitoring occasions 315 (e.g., different TTIs, such as monitoring occasion 315-a, monitoring occasion 315-b, monitoring occasion 315-c, and monitoring occasion 315-d).

Monitoring occasions may be portions or all of varying TTIs (e.g., slots, mini-slots, frames, subframes, or the like). Each of the CORESETs may also correspond to search spaces (e.g., a first, second, third, and fourth search space) and each SSB may correspond to a search space (e.g., a fifth search space) which UE 115-b may monitor. In some examples, the configuration information may also indicate a timing or periodicity for SSB 1. In an illustrative example, SSB1 may have a periodicity of four slots, or may be scheduled for a single slot (e.g., monitoring occasion 315-d) within a time period.

The configuration information may additionally indicate spatial quasi co-location relationships between one or more of the CORESETs, SSBs, CSI-RSs, or the like. For instance, the configuration information may indicate that CORESET 2 has a quasi co-location relationship with CORESET 1, and that CORESET 3 has no quasi co-location relationship with any of CORESETs 1, 2, and 3. Further, the configuration information may indicate that SSB1 has a co-location relationship with CORESET 0.

During monitoring occasion 315-a, UE 115-b may select CORESET 0 and CORESET 2 for monitoring, and may monitor corresponding search spaces to determine whether a base station 105 has sent a control channel transmission on any of CORESET 0 and CORESET 2. As described herein, base station 105 may be aware (as a result of the beamforming capability report) that UE 115-b is capable of supporting both receive beam 310-a and receive beam 310-b. Thus, UE 115-b may be capable of simultaneously monitoring two search spaces during monitoring occasion 315-a. Selecting CORESET 0 and CORESET 1 may be based on the fact that UE 115-b is capable of generating receive beam 310-a and receive beam 310-b, and therefore can select a number of CORESETs for simultaneous monitoring that is less than or equal to the number of supported receive beams (e.g., two).

Base station 105 may transmit a control channel transmission in CORESET 0 and a control channel transmission in CORESET 2. In such examples, despite the fact that CORESET 0 and CORESET 2 are not quasi co-located, UE 115-b may simultaneously monitor the first search space using beam 310-a and the third search space using beam 310-b during monitoring occasion 315-a, and may simultaneously receive the two control channel transmissions in CORESET 0 and CORESET 2.

During monitoring occasion 315-b, UE 115-b may select CORESET 0 and CORESET 1 for monitoring, and may monitor corresponding search spaces to determine whether base station 105 has sent a control channel transmission on any of CORESET 0 and CORESET 1. Because of the beamforming capability report, base station 105 may transmit a control channel transmission in CORESET 0 and a control channel transmission in CORESET 1. In such examples, UE 115-b may monitor the first search space using beam 310-a and the second search space using beam 310-b during monitoring occasion 315-b, and may simultaneously receive the two control channel transmission in CORESET 0 and CORESET 1.

In monitoring occasion 315-c, there may be no overlapping CORESETs, and UE 115-b may monitor the first search space using beam 310-a or 310-b, and receive a control channel transmission during CORESET 0 without needing to simultaneously monitor search spaces.

During monitoring occasion 315-d, CORESET 0, CORESET 1, CORESET 2, CORESET 3, and SSB 1 may overlap with respect to time, UE 115-b may select two CORESETs based on its indicated capability of supporting two simultaneously receive beams.

The UE 115-b may select which of CORESETs 0 to 3 to monitor based on a number of factors, including based on configuration information provided to the UE 115-b from base station 105-a. In some examples, the UE 115-b may select the number of CORESETs that do not have a spatial quasi co-location relationship up to the number of supported receive beams based on an index assigned to the CORESETs. For example, the UE 115-b may select to monitoring the CORESETs having the lowest indexes, the highest indexes, even indexes, odd indexes, or the like. In an example, UE 115-b may select CORESET 0 and CORESET 1 for simultaneous monitoring as they are the CORESETs having the two lowest indexes and the UE supports two simultaneous receive beams. In such examples, UE 115-b may simultaneously monitor, during monitoring occasion 315-d, a first search space corresponding to CORESET 0 using receive beam 310-a and a second search space corresponding to CORESET 1 using receive beam 310-b, and may receive a first control channel transmission and a second control channel transmission in CORESET 0 and CORESET 1, respectively.

The UE 115-b may use quasi co-location relationships to select a greater number of CORESETs to monitor during monitoring occasion 315-d than the number of receive beams the UE 115-b is capable of simultaneously supporting. In an example, during monitoring occasion 315-d, UE 115-b may determine, based on the CORESET configuration information, that there is a quasi co-location relationship between CORESET 1 and CORESET 2. UE 115-b may therefore also monitor a third search space corresponding to CORESET 2 also using receive beam 310-b and receive a third control channel transmission in CORESET 2 during monitoring occasion 315-d.

Base station 105 may be aware, based on the UE beamforming capability report, that UE 115-b is not capable of supporting more than two receive beams 310. In an example, base station 105 may schedule control channel transmissions on the CORESETs with the lowest index values (e.g., CORESET 0 and CORESET 1). But, base station 105 may also schedule a control channel transmission for UE 115-b in CORESET 2, based on the quasi co-location relationship between CORESET 1 and CORESET 2. However, because UE 115-b does not support a third beam in this example, the UE 115-b is unable to monitor CORESET 3 because CORESET 3 is not spatially quasi co-located with any of CORESET 0, CORESET 1, or CORESET 2. Base station 105 may thus refrain from scheduling a control channel transmissions for UE 115-b during monitoring occasion 315-d in CORESET 3. UE 115-b may therefore ignore a search space corresponding to CORESET 3 during monitoring occasion 315-d.

The UE 115-b may use quasi co-location relationships to monitor one or more SSBs that also occur during the monitoring occasion 315-d. In an example, during monitoring occasion 315-d, UE 115-b may determine, based on SSB configuration information received from base station 105-a, that SSB 1 is scheduled for transmission during monitoring occasion 315-d. UE 115-b may further determine, based on the SSB configuration information and CORESET configuration information, that SSB 1 is quasi co-located with CORESET 0. UE 115-b may simultaneously monitor for and receive SSB1 along with CORESET 0 using the same receive beam 310-a based on their spatial quasi co-location relationship, during monitoring occasion 315-d. In some examples, zero or a single CORESET may occur within a particular monitoring occasion, and UE 115-b may allocate its beams accordingly, and also monitor additional SSBs having a spatial quasi co-location with a SSB or CORESET to which one of the receive beams is allocated to monitor.

The UE 115-b may use quasi co-location relationships to monitor one or more CSI-RSs that also occur during the monitoring occasion 315-d. In an example, during monitoring occasion 315-d, UE 115-b may determine, based on CSI-RS configuration information received from base station 105-a, that CSI-RS 1 is scheduled for transmission during monitoring occasion 315-d. UE 115-b may further determine, based on the SSB configuration information and CORESET configuration information, that CSI-RS 1 is quasi co-located with CORESET 1. UE 115-b may simultaneously monitor for and receive CSI-RS 1 along with CORESET 1 using the same receive beam 310-b based on their spatial quasi co-location relationship, during monitoring occasion 315-d. In some examples, zero or a single CORESET may occur and/or zero or a single SSB may occur within a particular monitoring occasion, and UE 115-b may allocate its beams accordingly. The UE 115-b may also monitor additional CSI-RSs having a spatial quasi co-location with a SSB or CORESET, or other CSI-RSs, to which one of the receive beams is allocated to monitor.

Thus, during monitoring occasion 315-d, UE 115-b may simultaneously monitor for and receive, using receive beam 310-a, SSB 1 and CORESET 0 (which are quasi co-located). At the same time, UE 115-b may also monitor, using receive beam 310-b, CORESET 1, CORESET 2, and CSI RS 1 (which are quasi co-located). During monitoring occasion 315-d, the UE 115-b may not monitor CORESET 3 as CORESET 3 is not spatially quasi co-located with either of CORESET 0 or CORESET 1, and, in this example, the UE 115-b supports only two simultaneous receive beams. It is noted that FIG. 3 provides an example, and that a UE supporting different numbers of receive beams may be able to simultaneously monitor for different numbers of CORESETs, SSBs, and CSI-RSs in accordance with the techniques described herein.

Figure 4:
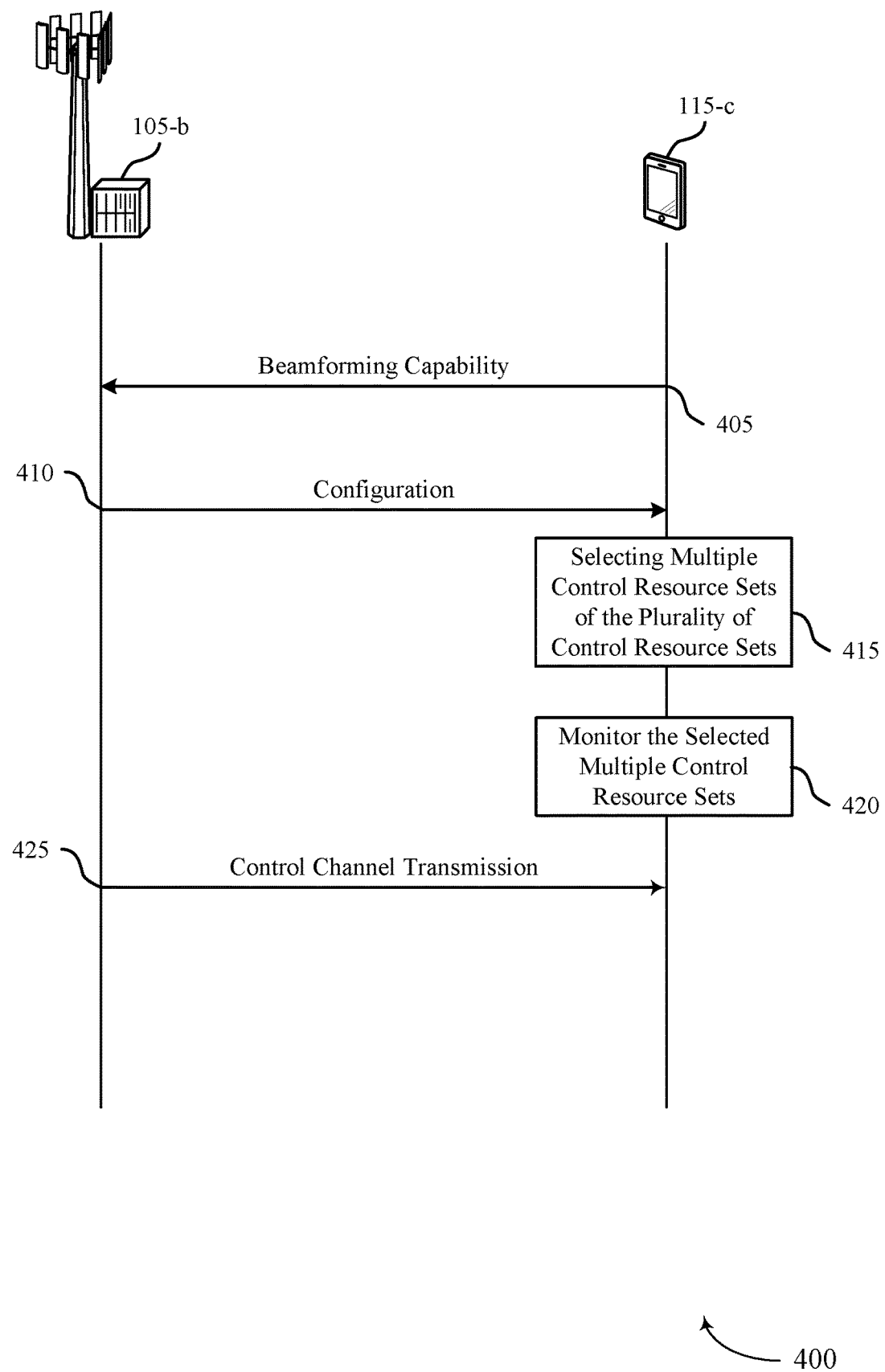
FIG. 4 illustrates an example of a process flow in accordance with aspects of the present disclosure.

FIG. 4 illustrates an example of a process flow 400 that supports synchronization signal block and physical downlink control channel search space monitoring based on user equipment beamforming capability in accordance with aspects of the present disclosure. In some examples, process flow 400 may be implemented by UE 115-c and base station 105-b, which may be examples of corresponding devices described with respect to wireless communications system 100.

At 405, UE 115-c may transmit a report indicating a beamforming capability of the UE to base station 105-b. The report may include an indication of a number of receive chains at UE 115-c, a number of simultaneous receive beams UE 115-c is capable of generating, or a combination thereof. In some examples, the report may include an indication of a number of reference signals that are not spatially quasi co-located with respect to receive beamforming with each other that UE 115-c is capable of simultaneously monitoring, or the like. In some examples, the capability of simultaneous monitoring may further indicate that UE 115-c is capable of simultaneously receiving the signals where the received signal satisfies a threshold (e.g., meets or exceeds a minimum received power level). In some examples, the threshold may be conveyed via DCI, MAC-CE, or RRC signaling.

At 410, base station 105-b may transmit configuration information for a plurality of CORESETs based on the report, to UE 115-c. The configuration information may indicate a respective periodicity for each of the plurality of CORESETs. The configuration information may also provide a configuration for other types of transmissions, such as one or more SSBs, CSI-RSs, or the like, or the base station 105-b may separately provide configuration for each type of transmission.

At 415, UE 115-c may select a number (e.g., multiple CORESETs) of the plurality of CORESETs to monitor during a monitoring occasion, based on the beamforming capability. In some examples, at least two of the plurality of CORESETs may partially or completely overlap (e.g., with respect to time and/or frequency) during the monitoring occasion, and/or at least one SSB or CSI-RS may overlap with at least one of the plurality of CORESETs during the monitoring occasion. In some examples, DMRSs corresponding to respective CORESETs that overlap within a particular monitoring occasion may not be spatially quasi co-located. For example, the DMRS of a set of control resources sets whose monitoring occasions overlap may not be quasi-co-located with respect to type D. In some examples, the UE may select one or more CORESETs based on the beamforming capability. In some examples, UE 115-c may identify one or more spatial quasi co-location relationships between respective pairs of the plurality of CORESETs, or pairs of SSBs, or pairs of CSI-RSs, or any combination thereof, and may select the number of CORESETs based on the quasi co-location relationships. UE 115-c may additionally identify a quasi co-location relationship between a selected CORESET and an unselected CORESET, and monitor the selected and unselected CORESETs based on the identified quasi co-location relationship.

In some examples, UE 115-c may select CORESETs that have the lowest index of the indices assigned to the multiple CORESETs. That is, UE 115-c may select CORESETs from the plurality of CORESETs based on the respective index assigned to each CORESET of the plurality of CORESETs.

In some examples, UE 115-c may select one or more CORESETs to include up to the number of simultaneous beams the beamforming capability report at 405 indicates the UE 115-c supports.

UE 115-c may select a number of CORESETs to monitor based on a number of SSBs or CSI-RSs that occur during the monitoring occasion. In some examples, UE 115-c select a number of SSBs or CSI-RSs to monitor during the monitoring occasion based on the beamforming capability. UE 115-c may identify a quasi co-location relationship between a selected SSB and a unselected SSB or a selected CSI-RS and an unselected CSI-RS, or at least one selected CORESET and an SSB or CSI-RS, and may monitor both SSBs or both CSI-RSs during the monitoring occasion. In some examples, UE 115 may select at least a single CORESET and an SSB or a single CORESET and a CSI-RS, and may simultaneously monitor both the single CORESET and SSB or the single CORESET and CSI-RS during the monitoring occasion. If both a CSI-RS and an SSB are quasi co-located with a selected CORESET, then UE 115-c may simultaneously monitor all three during the monitoring occasion using one available receive beam, and my simultaneously monitor another selected CORESET using another available receive beam.

At 420, UE 115 may monitor the selected number of CORESETs during the monitoring occasion. In some examples, UE 115 may simultaneously monitor, during a same monitoring occasion, a number of CORESETs based on the beamforming capability of the UE, and/or any SSBs or CSI-RSs that are quasi co-located with one of the selected number of CORESETs. For example, if a UE 115 is capable of supporting M simultaneous beams, where M is an integer, the UE 115 may monitor a combination of M different CORESETs, SSBs, and/or CSI-RSs, none of which have a spatial quasi co-location relationship. The UE 115 may also monitor one or more additional CORESETs, SSBs, and/or CSI-RSs that have a spatial quasi co-location relationship with the combination of M different CORESETs, SSBs, and/or CSI-RSs.

In some examples, monitoring may include monitoring a search space corresponding to a selected CORESET for a control channel transmission within that CORESET during that monitoring occasion (e.g., slot). If UE 115-c is able to successfully decode the search space, then the search space includes a control channel transmission of that selected CORESET for UE 115-c. For example, UE 115-c may monitor a respective search space corresponding to each CORESET of the selected number of CORESETs during the monitoring occasion. In some examples, UE 115-c may monitor a respective search space corresponding to each CORESETs of the selected number of CORESETs during the monitoring occasion. In some examples, UE 115-c may receive a DMRS within a search space corresponding to PDCCH candidate for a first CORESET of the selected number of CORESETs, and may decode a control channel of the first CORESET corresponding to the search space based on the DMRS.

At 425, base station 105-b may transmit one or more control channel transmissions. UE 115-c may receive the control channel transmission based on the monitoring. For example, UE 115-c may receive a first control channel transmission on a first receive beam, and a second control channel transmission on a second receive beam, in first and second CORESETs, respectively. In some examples, UE 115-c may receive a first and second control channel transmission in first and second CORESETs that are not quasi co-located, and one or more of a third control channel transmission, an SSB, a CSI-RS, or the like, in an unselected CORESET that is quasi co-located with one of the selected CORESETs. Subsequently, the base station 105-b and the UE 115-c may communicate in accordance with the one or more control channel transmissions.

Figure 5:
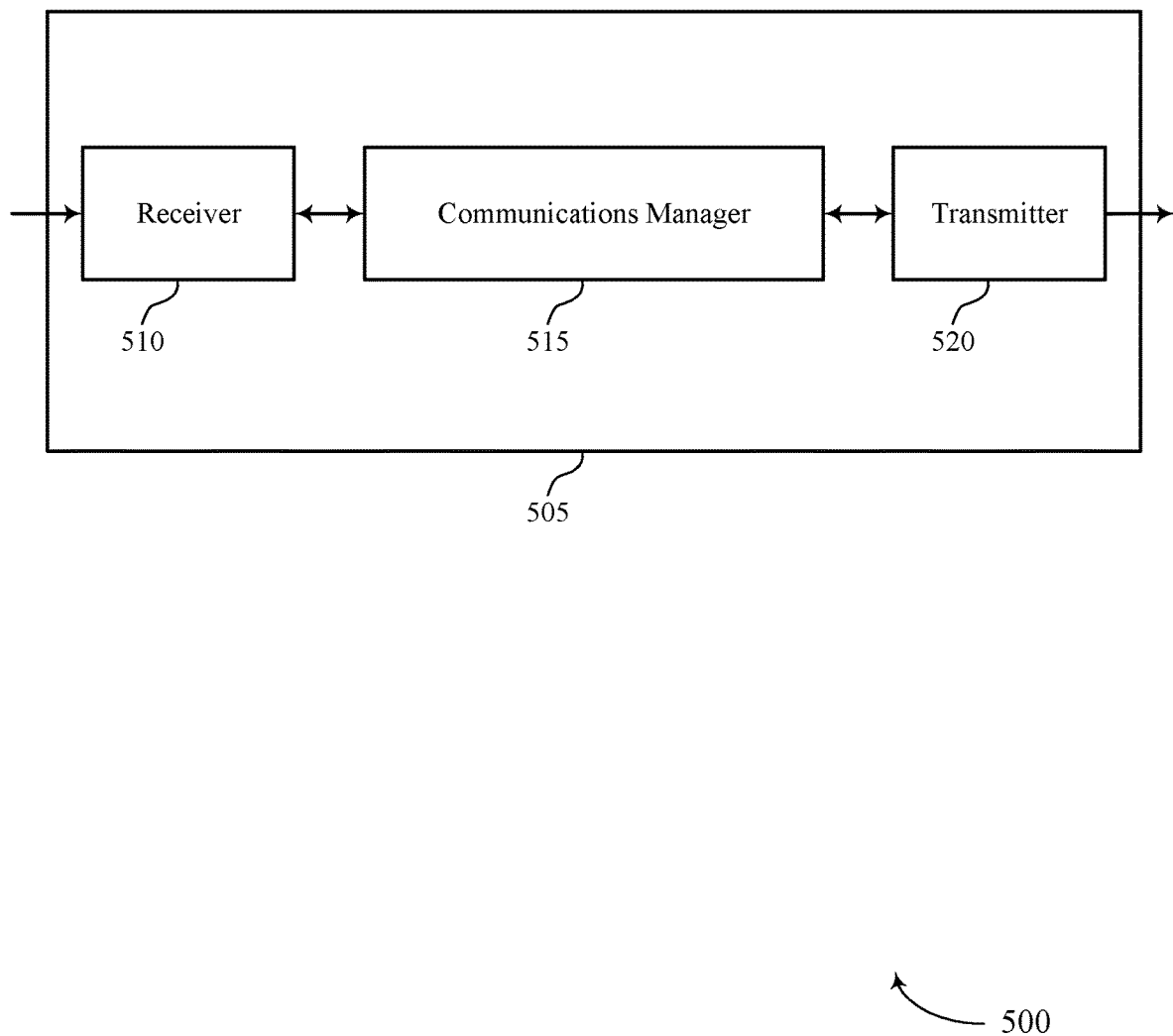
FIGS. 5 and 6 show block diagrams of devices in accordance with aspects of the present disclosure.

FIG. 5 shows a block diagram 500 of a device 505 that supports synchronization signal block and physical downlink control channel search space monitoring based on user equipment beamforming capability in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to synchronization signal block and physical downlink control channel search space monitoring based on user equipment beamforming capability, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a base station, a report indicating a beamforming capability of the UE, receive, from the base station, a configuration for a set of CORESETs based on the report, select, based on the beamforming capability, a number (e.g., multiple CORESETs) of the set of CORESETs to monitor during a monitoring occasion, and monitor the selected number of CORESETs during the monitoring occasion. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to receive, from a base station, a configuration for a plurality of CORESETs and select, based on a beamforming capability, a number of the plurality of CORESETs to monitor during a monitoring occasion. Device 505 may monitor the selected number of CORESETs during the monitoring occasion. Monitoring the CORESETs may increase reliability and reduce latency during communications.

Based on techniques for monitoring CORESETs as described herein, a processor of a UE 115 (e.g., controlling the receiver 510, the transmitter 520, or the transceiver 820 as described with reference to FIG. 8) may increase reliability and decrease signaling overhead in communications because the UE 115 may avoid going through unnecessary process of separating the multiple search spaces in time during transmissions.

Figure 6:
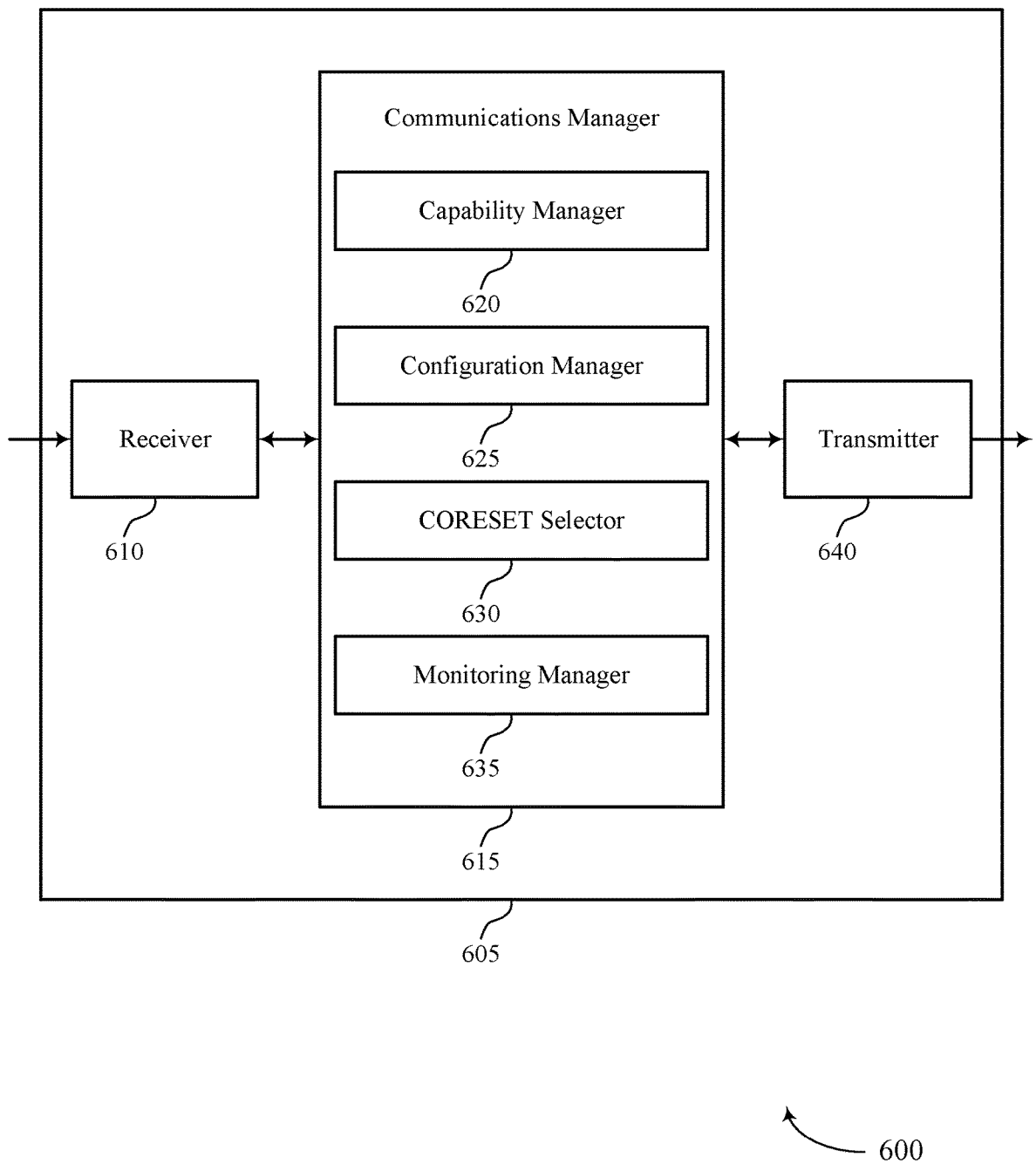

FIG. 6 shows a block diagram 600 of a device 605 that supports synchronization signal block and physical downlink control channel search space monitoring based on user equipment beamforming capability in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to synchronization signal block and physical downlink control channel search space monitoring based on user equipment beamforming capability, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a capability manager 620, a configuration manager 625, a CORESET selector 630, and a monitoring manager 635. The communications manager 615 may be an example of aspects of the communications manager 810 described herein.

The capability manager 620 may transmit, to a base station, a report indicating a beamforming capability of the UE.

The configuration manager 625 may receive, from the base station, a configuration for a set of CORESETs based on the report.

The CORESET selector 630 may select, based on the beamforming capability, a number (e.g., multiple CORESETs) of the set of CORESETs to monitor during a monitoring occasion. The monitoring manager 635 may monitor the selected number of CORESETs during the monitoring occasion.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

In some examples, the communications manager 615 may be implemented as an integrated circuit or chipset for a mobile device modem, and the receiver 610 and transmitter 640 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to receive, from a base station, a configuration for a plurality of CORESETs and select, based on a beamforming capability, a number of the plurality of CORESETs to monitor during a monitoring occasion. Device 605 may monitor the selected number of CORESETs during the monitoring occasion. Monitoring the CORESETs may increase reliability and reduce latency during communications.

Based on techniques for monitoring CORESETs as described herein, a processor of a UE 115 (e.g., controlling the receiver 610, the transmitter 640, or the transceiver 820 as described with reference to FIG. 8) may increase reliability and decrease signaling overhead in communications because the UE 115 may avoid going through unnecessary process of separating the multiple search spaces in time during transmissions.

Figure 7:
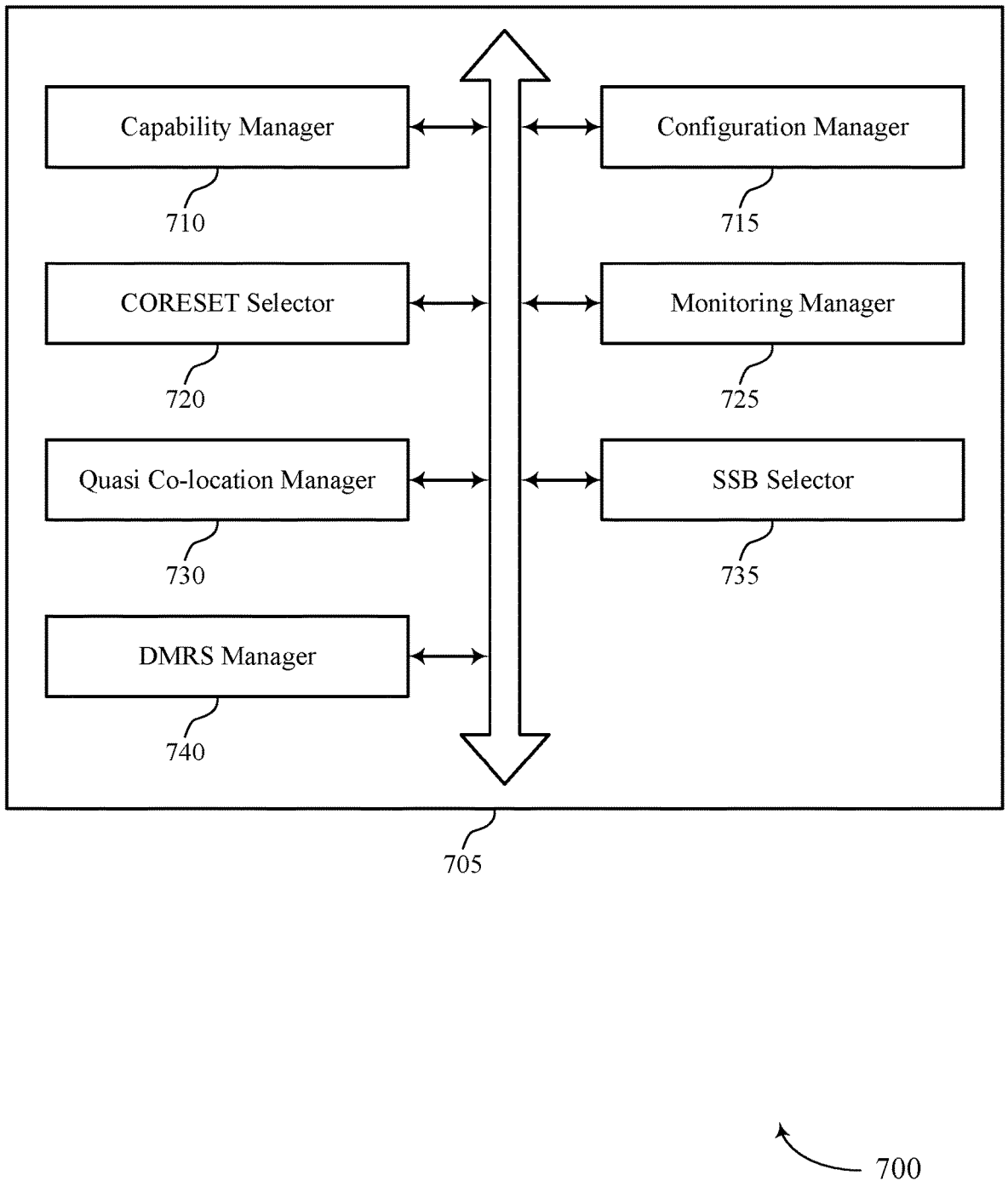
FIG. 7 shows a block diagram of a communications manager in accordance with aspects of the present disclosure.

FIG. 7 shows a block diagram 700 of a communications manager 705 that supports synchronization signal block and physical downlink control channel search space monitoring based on user equipment beamforming capability in accordance with aspects of the present disclosure. The communications manager 705 may be an example of aspects of a communications manager 515, a communications manager 615, or a communications manager 810 described herein. The communications manager 705 may include a capability manager 710, a configuration manager 715, a CORESET selector 720, a monitoring manager 725, a quasi co-location manager 730, a SSB selector 735, and a DMRS manager 740. Each of these modules may communicate, directly or indirectly, with one another (e.g., via one or more buses).

The capability manager 710 may transmit, to a base station, a report indicating a beamforming capability of the UE. In some cases, the report indicates a number of receive chains at the UE. In some cases, the report indicates a number of simultaneous receive beams the UE is capable of generating. In some cases, the report indicates a number of reference signals that are not spatially quasi co-located with respect to receive beamforming with each other that the UE is capable of simultaneously monitoring. In some cases, the report further indicates a threshold received signal strength, and where the UE is capable of simultaneously monitoring when the threshold is satisfied. In some cases, the threshold is configured (e.g., by the wireless communication system 100) through one or more of DCI, media access control channel element (MAC-CE), and RRC signaling.

The configuration manager 715 may receive, from the base station, a configuration for a set of CORESETs based on the report. In some examples, the configuration manager

715 may identify a respective periodicity of each of the set of CORESETs based on the configuration.

The CORESET selector 720 may select, based on the beamforming capability, a number (e.g., multiple CORESETs) of the set of CORESETs to monitor during a monitoring occasion. In some examples, the CORESET selector 720 may select, based on the beamforming capability, the number of the set of CORESETs to monitor in which at least two of the set of CORESETs overlap during the monitoring occasion. In some examples, the CORESET selector 720 may select, based on the beamforming capability, the number of the set of CORESETs to monitor in which at least one of the set of CORESETs overlaps with at least one SSB or CSI-RS during the monitoring occasion.

In some examples, the CORESET selector 720 may select, based on the beamforming capability, the number of the set of CORESETs to monitor based on a number of simultaneous beams the beamforming capability indicates that the UE supports. In some examples, the CORESET selector 720 may select the number of the set of CORESETs to monitor based on one or more quasi co-location relationships between respective pairs of the set CORESETs. In some examples, the CORESET selector 720 may select the number of the set of CORESETs to monitor based on one or more quasi co-location relationships between respective pairs of SSBs or CSI-RS. In some examples, the CORESET selector 720 may select a subset of the set of CORESETs that occur during the monitoring occasion based on the beamforming capability.

In some examples, the CORESET selector 720 may identify, based on the configuration for the set of CORESETs, a second subset of the set of CORESETs that does not have a quasi co-location relationship with any CORESET within the subset. In some examples, the CORESET selector 720 may select the subset of the set of CORESETs based on a respective index assigned to each CORESET of the set of CORESETs and the beamforming capability. In some examples, the CORESET selector 720 may select one or more CORESETs to include in the subset up to a number of simultaneous beams the beamforming capability indicates that the UE supports. In some examples, the CORESET selector 720 may select the number of the set of CORESETs to monitor based on a number of SSBs or CSI-RSs that occur during the monitoring occasion.

In some examples, the CORESET selector 720 may select, based on the beamforming capability, a second number of the set of CORESETs to monitor during a second monitoring occasion. In some examples, the CORESET selector 720 may monitor the selected second number of CORESETs during the second monitoring occasion.

The monitoring manager 725 may monitor the selected number of CORESETs during the monitoring occasion. In some examples, the monitoring manager 725 may monitor the first CORESET and the second CORESET during the monitoring occasion. In some examples, the monitoring manager 725 may monitor a respective search space corresponding to each CORESET of the selected number of CORESETs during the monitoring occasion. In some cases, the selected number of set of CORESETs includes a single CORESET, where the monitoring further includes monitoring the single CORESET and at least one SSB or CSI-RS during the monitoring occasion.

The quasi co-location manager 730 may identify, based on the configuration, a quasi co-location relationship between a first CORESET within the subset and a second CORESET that is not included within the subset, where the first CORESET and the second CORESET are included within the selected number of CORESETs. In some examples, identifying, based on the configuration for the set of CORESETs, a quasi co-location relationship between a first SSB within the subset and a second SSB that is not included within the subset, where the monitoring further includes monitoring the first SSB and the second SSB during the monitoring occasion.

The SSB selector 735 may select a subset of the number of SSBs to monitor during the monitoring occasion based on the beamforming capability.

The DMRS manager 740 may receive a demodulation reference signal within a control channel candidate corresponding to a first CORESET of the selected number of CORESETs. In some examples, the DMRS manager 740 may decode a control channel of the first CORESET corresponding to the control channel candidate based on the demodulation reference signal.

Figure 8:
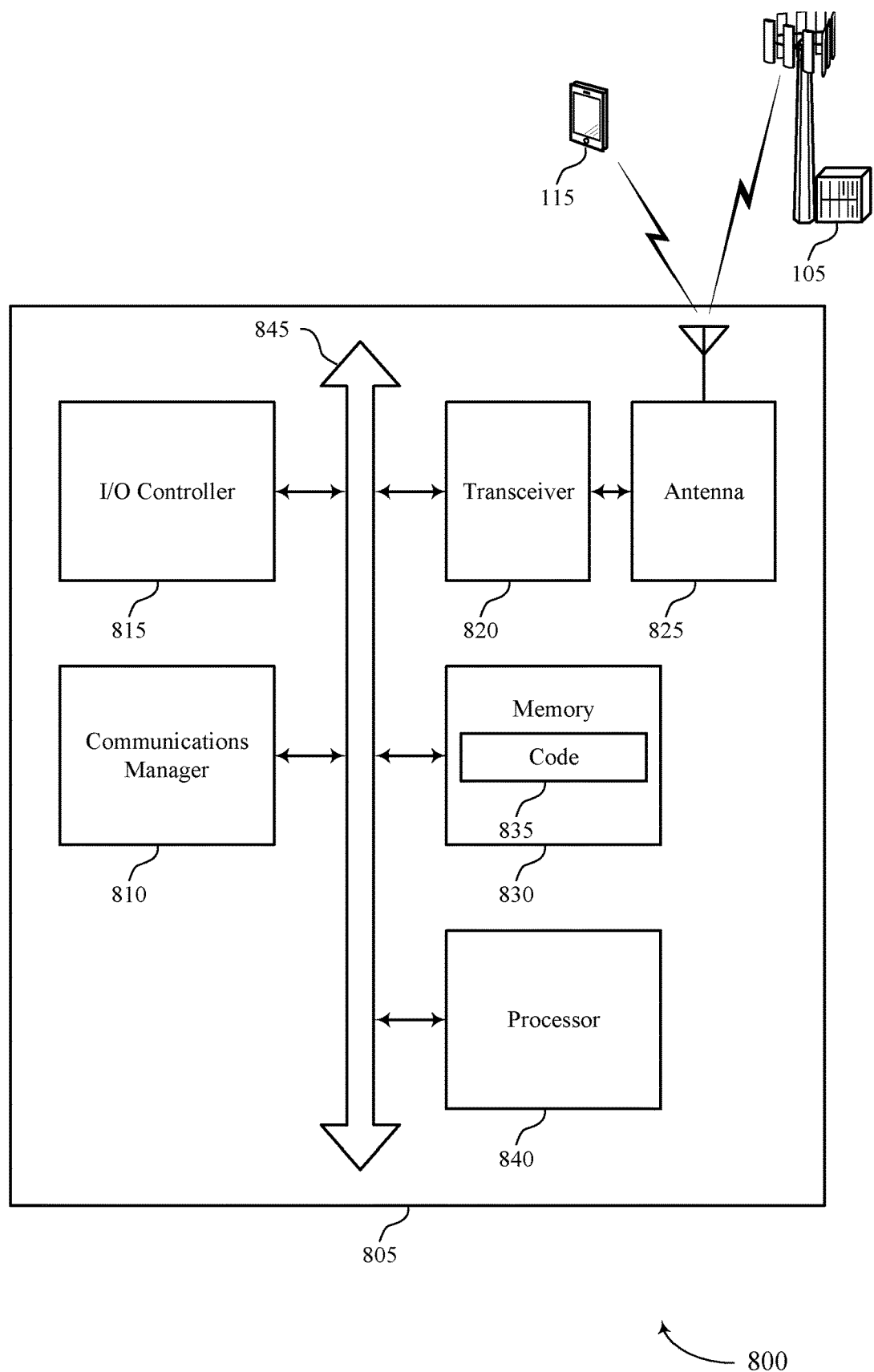
FIG. 8 shows a diagram of a system including a device in accordance with aspects of the present disclosure.

FIG. 8 shows a diagram of a system 800 including a device 805 that supports synchronization signal block and physical downlink control channel search space monitoring based on user equipment beamforming capability in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, to a base station, a report indicating a beamforming capability of the UE, receive, from the base station, a configuration for a set of CORESETs based on the report, select, based on the beamforming capability, a number (e.g., multiple CORESETs) of the set of CORESETs to monitor during a monitoring occasion, and monitor the selected number of CORESETs during the monitoring occasion.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a Basic Input/Output System (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting synchronization signal block and physical downlink control channel search space monitoring based on user equipment beamforming capability).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
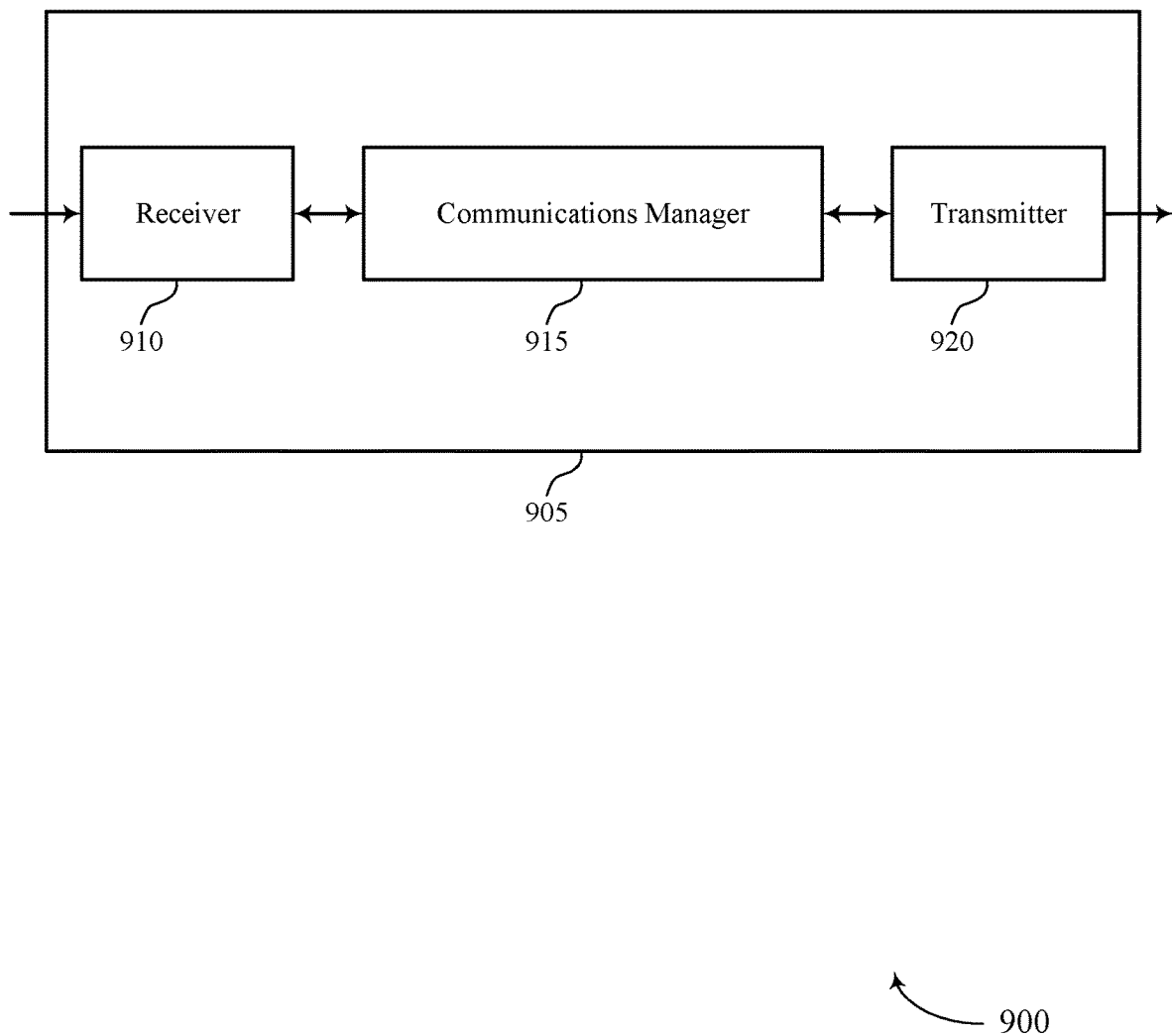
FIGS. 9 and 10 show block diagrams of devices in accordance with aspects of the present disclosure.

FIG. 9 shows a block diagram 900 of a device 905 that supports synchronization signal block and physical downlink control channel search space monitoring based on user equipment beamforming capability in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to synchronization signal block and physical downlink control channel search space monitoring based on user equipment beamforming capability, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, a report indicating a beamforming capability of the UE, transmit a configuration for a set of CORESETs based on the report, select, based on the beamforming capability, a number (e.g., multiple CORESETs) of the set of CORESETs in which to send a control channel transmission during a monitoring occasion, and transmit at least one control channel transmission during the monitoring occasion based on the selected number of CORESETs. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
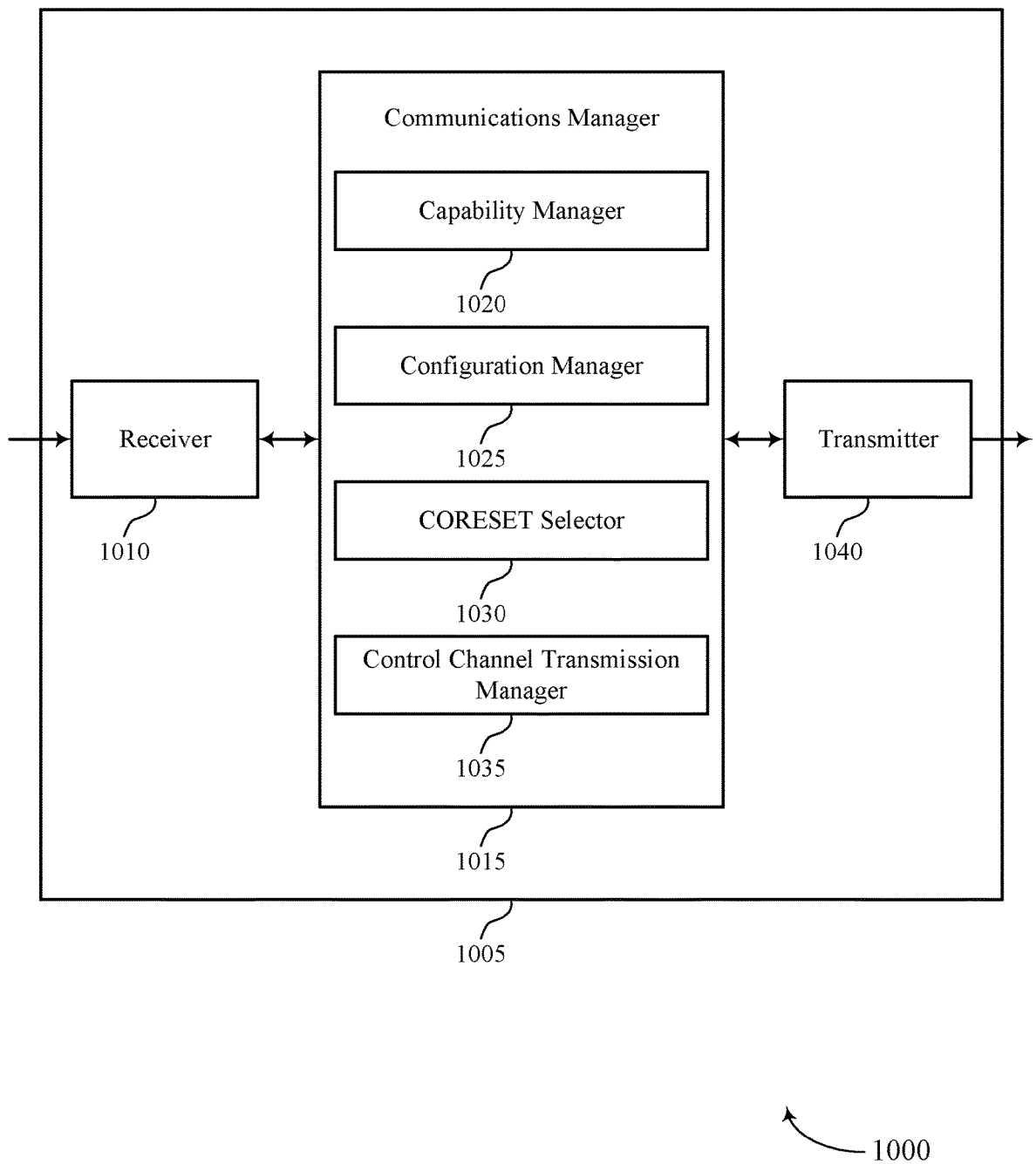

FIG. 10 shows a block diagram 1000 of a device 1005 that supports synchronization signal block and physical downlink control channel search space monitoring based on user equipment beamforming capability in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to synchronization signal block and physical downlink control channel search space monitoring based on user equipment beamforming capability, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a capability manager 1020, a configuration manager 1025, a CORESET selector 1030, and a control channel transmission manager 1035. The communications manager 1015 may be an example of aspects of the communications manager 1210 described herein.

The capability manager 1020 may receive, from a UE, a report indicating a beamforming capability of the UE. The configuration manager 1025 may transmit a configuration for a set of CORESETs based on the report. The CORESET selector 1030 may select, based on the beamforming capability, a number (e.g., multiple CORESETs) of the set of CORESETs in which to send a control channel transmission during a monitoring occasion.

The control channel transmission manager 1035 may transmit at least one control channel transmission during the monitoring occasion based on the selected number of CORESETs. The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
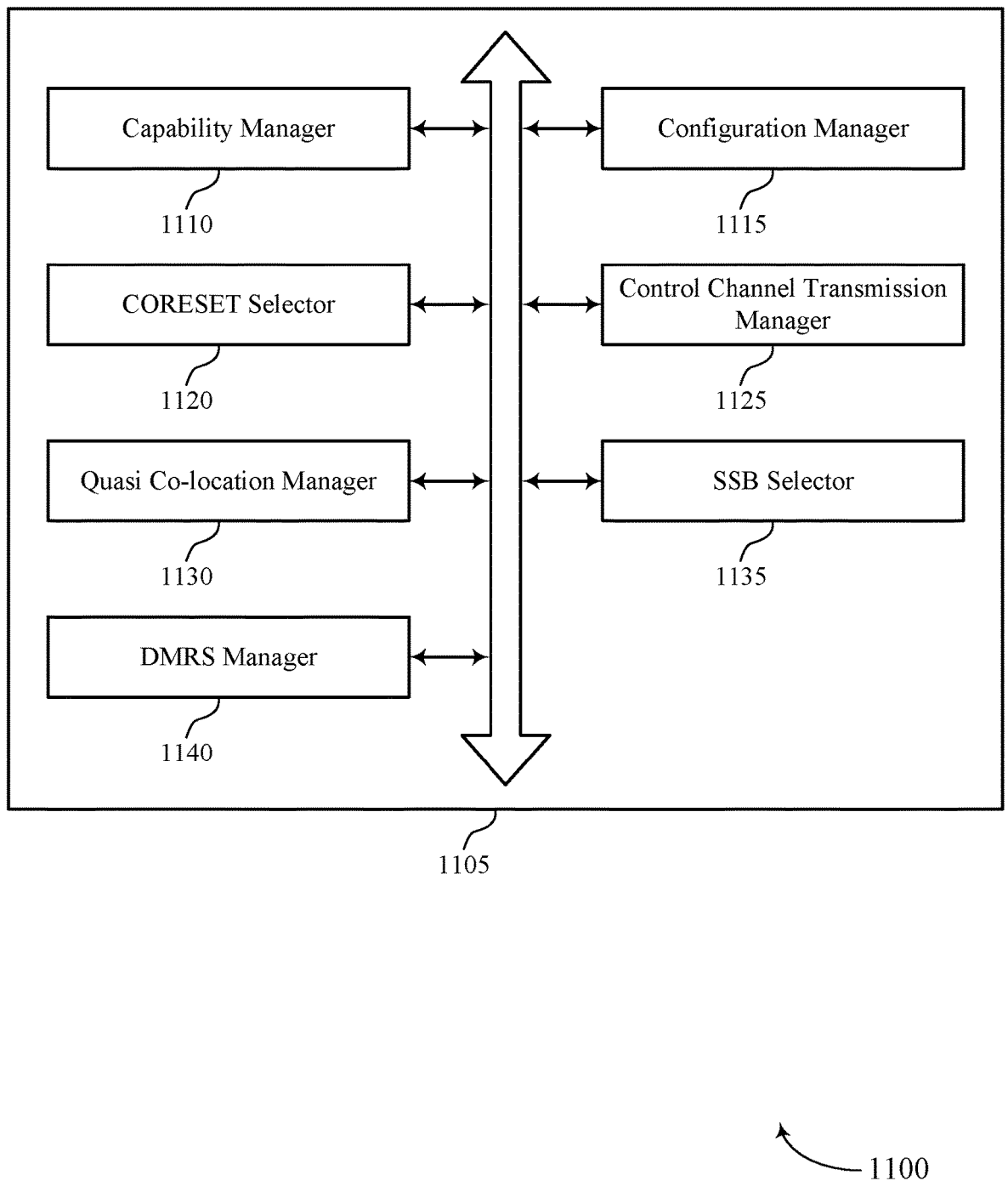
FIG. 11 shows a block diagram of a communications manager in accordance with aspects of the present disclosure.

FIG. 11 shows a block diagram 1100 of a communications manager 1105 that supports synchronization signal block and physical downlink control channel search space monitoring based on user equipment beamforming capability in accordance with aspects of the present disclosure. The communications manager 1105 may be an example of aspects of a communications manager 915, a communications manager 1015, or a communications manager 1210 described herein. The communications manager 1105 may include a capability manager 1110, a configuration manager 1115, a CORESET selector 1120, a control channel transmission manager 1125, a quasi co-location manager 1130, a SSB selector 1135, and a DMRS manager 1140. Each of these modules may communicate, directly or indirectly, with one another (e.g., via one or more buses).

The capability manager 1110 may receive, from a UE, a report indicating a beamforming capability of the UE. In some cases, the report indicates a number of receive chains at the UE. In some cases, the report indicates a number of simultaneous receive beams the UE is capable of generating. In some cases, the report indicates a threshold received signal strength, and where the report further indicates that the UE is capable of simultaneously monitoring when the threshold is satisfied. In some cases, the report indicates a number of reference signals that are not spatially quasi co-located with respect to receive beamforming with each other that the UE is capable of simultaneously monitoring. In some cases, the threshold is configured (e.g., by the wireless communication system 100) through one or more of DCI, media access control channel element (MAC-CE), and RRC signaling.

The configuration manager 1115 may transmit a configuration for a set of CORESETs based on the report. In some examples, the configuration manager 1115 may indicate, in the configuration, a respective periodicity of each of the set of CORESETs.

The CORESET selector 1120 may select, based on the beamforming capability, a number of the set of CORESETs in which to send a control channel transmission during a monitoring occasion. In some examples, the CORESET selector 1120 may select, based on the beamforming capability, the number of the set of CORESETs in which at least two of the set of CORESETs overlap during the monitoring occasion. In some examples, the CORESET selector 1120 may select, based on the beamforming capability, the number of the set of CORESETs in which at least one of the set of CORESETs overlaps with at least one SSB or CSI-RS during the monitoring occasion. In some examples, the CORESET selector 1120 may select, based on the beamforming capability, the number of the set of CORESETs based on a number of simultaneous beams the beamforming capability indicates that the UE supports.

In some examples, the CORESET selector 1120 may select the number of the set of CORESETs based on one or more quasi co-location relationships between respective pairs of the set CORESETs. In some examples, the CORESET selector 1120 may select the number of the set of CORESETs based on one or more quasi co-location relationships between respective pairs of SSBs or CSI-RS. In some examples, the CORESET selector 1120 may select a subset of the set of CORESETs that occur during the monitoring occasion based on the beamforming capability. In some examples, the CORESET selector 1120 may select the subset of the set of CORESETs based on a respective index assigned to each CORESET of the set of CORESETs and the beamforming capability.

In some examples, the CORESET selector 1120 may select one or more CORESETs to include in the subset up to a number of simultaneous beams the beamforming capability indicates that the UE supports. In some examples, the CORESET selector 1120 may select the number of the set of CORESETs based on a number of SSBs or channel state information reference signals (CSI-RSs) that occur during the monitoring occasion. In some examples, the CORESET selector 1120 may select, based on the beamforming capability, a second number of the set of CORESETs in which to send a control channel transmission during a second monitoring occasion. In some cases, the selected number of set of CORESETs includes a single CORESET, where the single CORESET and at least one SSB or CSI-RS occur during the monitoring occasion.

The control channel transmission manager 1125 may transmit at least one control channel transmission during the monitoring occasion based on the selected number of CORESETs. In some examples, the control channel transmission manager 1125 may transmit at least one control transmission during the first CORESET and at least one control transmission during the second CORESET during the monitoring occasion. In some examples, the control channel transmission manager 1125 may transmit at least a second control channel transmission during the second monitoring occasion based on the second number of the set of CORESETs.

The quasi co-location manager 1130 may identify, based on the configuration, a quasi co-location relationship between a first CORESET within the subset and a second CORESET that is not included within the subset, where the first CORESET and the second CORESET are included within the selected number of CORESETs. In some examples, the quasi co-location manager 1130 may identify, based on the configuration for the set of CORESETs, a second subset of the set of CORESETs that does not have a quasi co-location relationship with any CORESET within the subset. In some examples, the quasi co-location manager 1130 may identify, based on the configuration for the set of CORESETs, a quasi co-location relationship between a first SSB within the subset and a second SSB that is not included within the subset, where the first SSB and the second SSB occur during the monitoring occasion.

The SSB selector 1135 may identify a subset of the number of SSBs that occur during the monitoring occasion based on the beamforming capability. The DMRS manager 1140 may transmit a demodulation reference signal within a control channel candidate corresponding to a first CORESET of the selected number of CORESETs.

Figure 12:
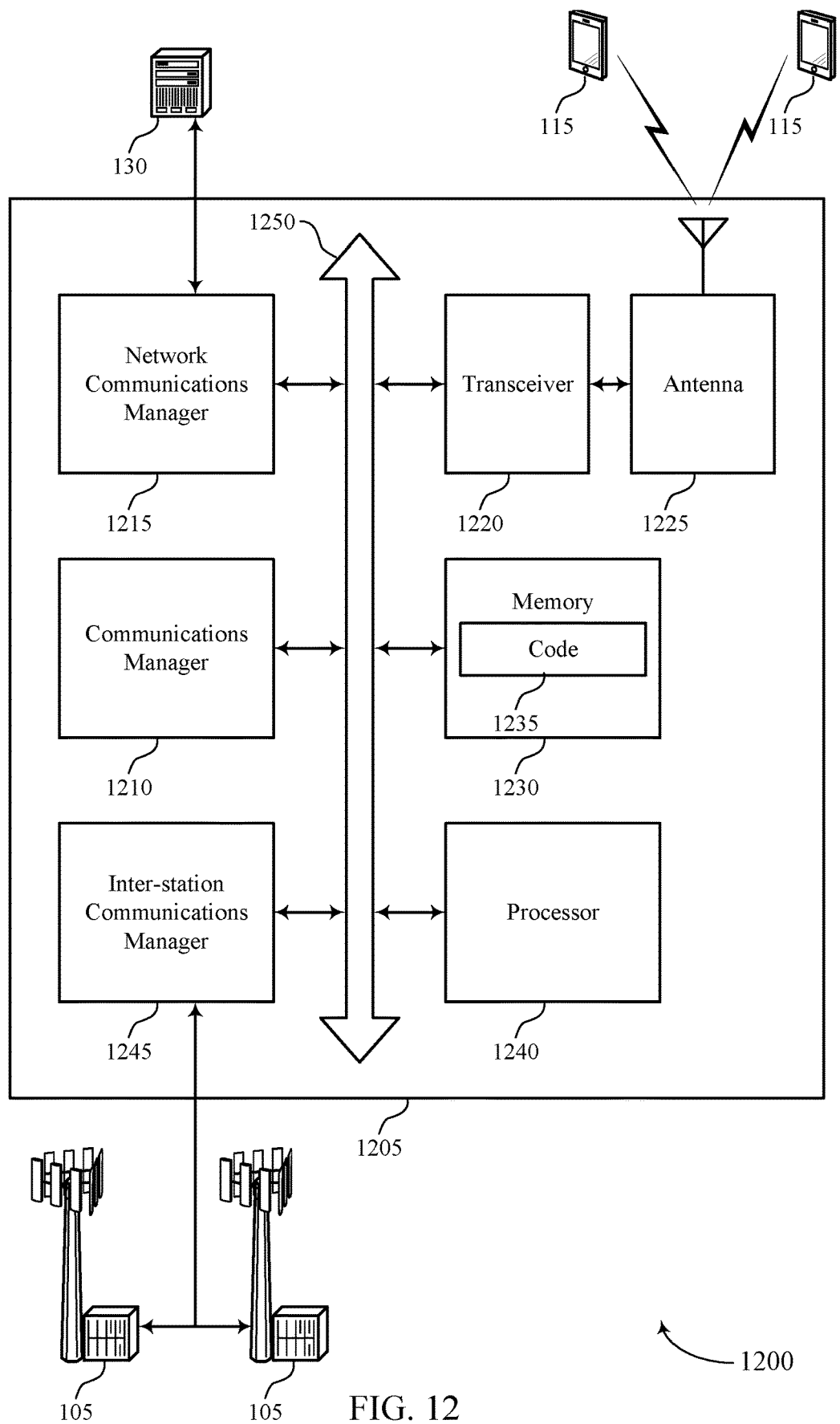
FIG. 12 shows a diagram of a system including a device in accordance with aspects of the present disclosure.

FIG. 12 shows a diagram of a system 1200 including a device 1205 that supports synchronization signal block and physical downlink control channel search space monitoring based on user equipment beamforming capability in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, a report indicating a beamforming capability of the UE, transmit a configuration for a set of CORESETs based on the report, select, based on the beamforming capability, a number (e.g., multiple CORESETs) of the set of CORESETs in which to send a control channel transmission during a monitoring occasion, and transmit at least one control channel transmission during the monitoring occasion based on the selected number of CORESETs.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting synchronization signal block and physical downlink control channel search space monitoring based on user equipment beamforming capability).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
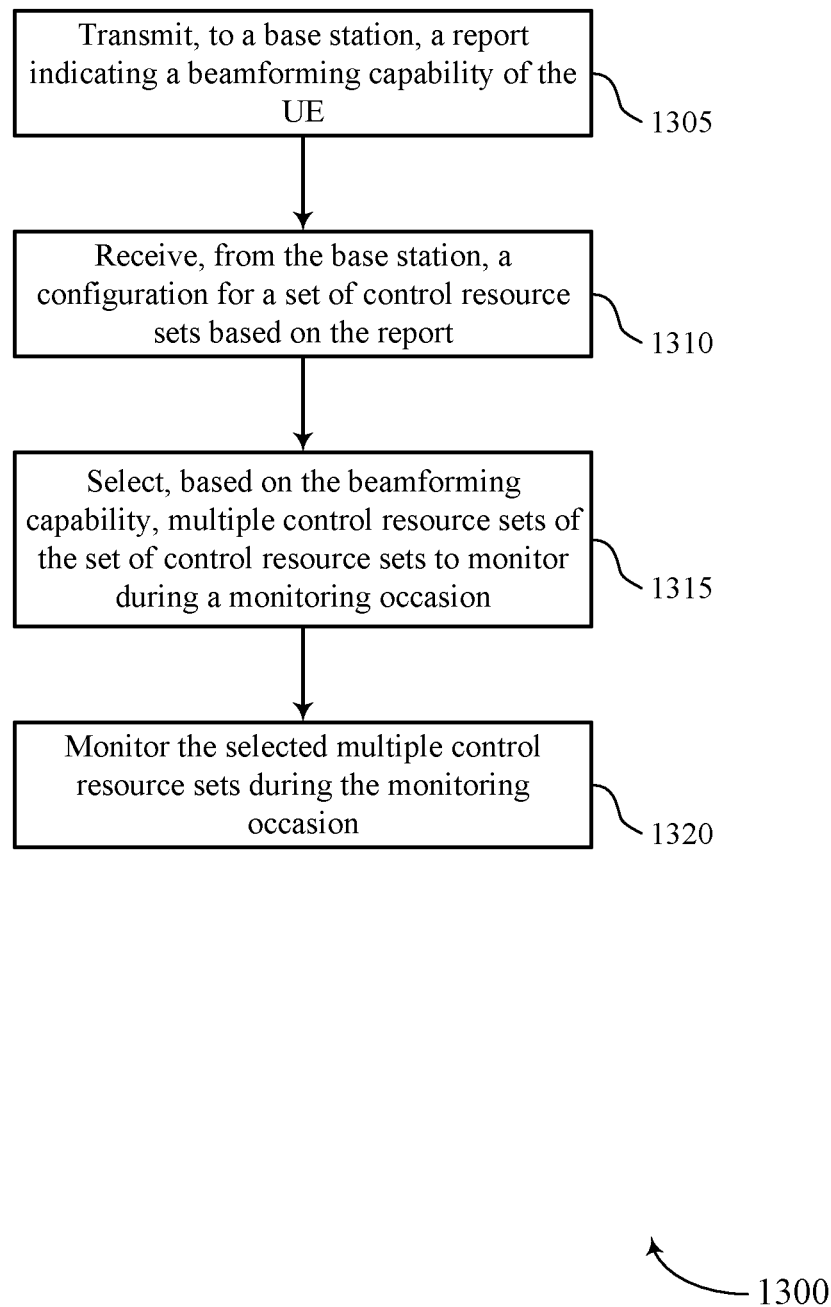
FIGS. 13 through 16 show flowcharts illustrating methods in accordance with aspects of the present disclosure.

FIG. 13 shows a flowchart illustrating a method 1300 that supports synchronization signal block and physical downlink control channel search space monitoring based on user equipment beamforming capability in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may transmit, to a base station, a report indicating a beamforming capability of the UE. The operations of 1305 may be performed according to the methods described herein. In some examples, aspects of the operations of 1305 may be performed by a capability manager as described with reference to FIGS. 5 through 8.

At 1310, the UE may receive, from the base station, a configuration for a set of CORESETs based on the report. The operations of 1310 may be performed according to the methods described herein. In some examples, aspects of the operations of 1310 may be performed by a configuration manager as described with reference to FIGS. 5 through 8.

At 1315, the UE may select, based on the beamforming capability, multiple CORESETS of the set of CORESETs (e.g., a number of the set of CORESETs) to monitor during a monitoring occasion. The operations of 1315 may be performed according to the methods described herein. In some examples, aspects of the operations of 1315 may be performed by a CORESET selector as described with reference to FIGS. 5 through 8.

At 1320, the UE may monitor the selected multiple CORESETs during the monitoring occasion. The operations of 1320 may be performed according to the methods described herein. In some examples, aspects of the operations of 1320 may be performed by a monitoring manager as described with reference to FIGS. 5 through 8.

Figure 14:
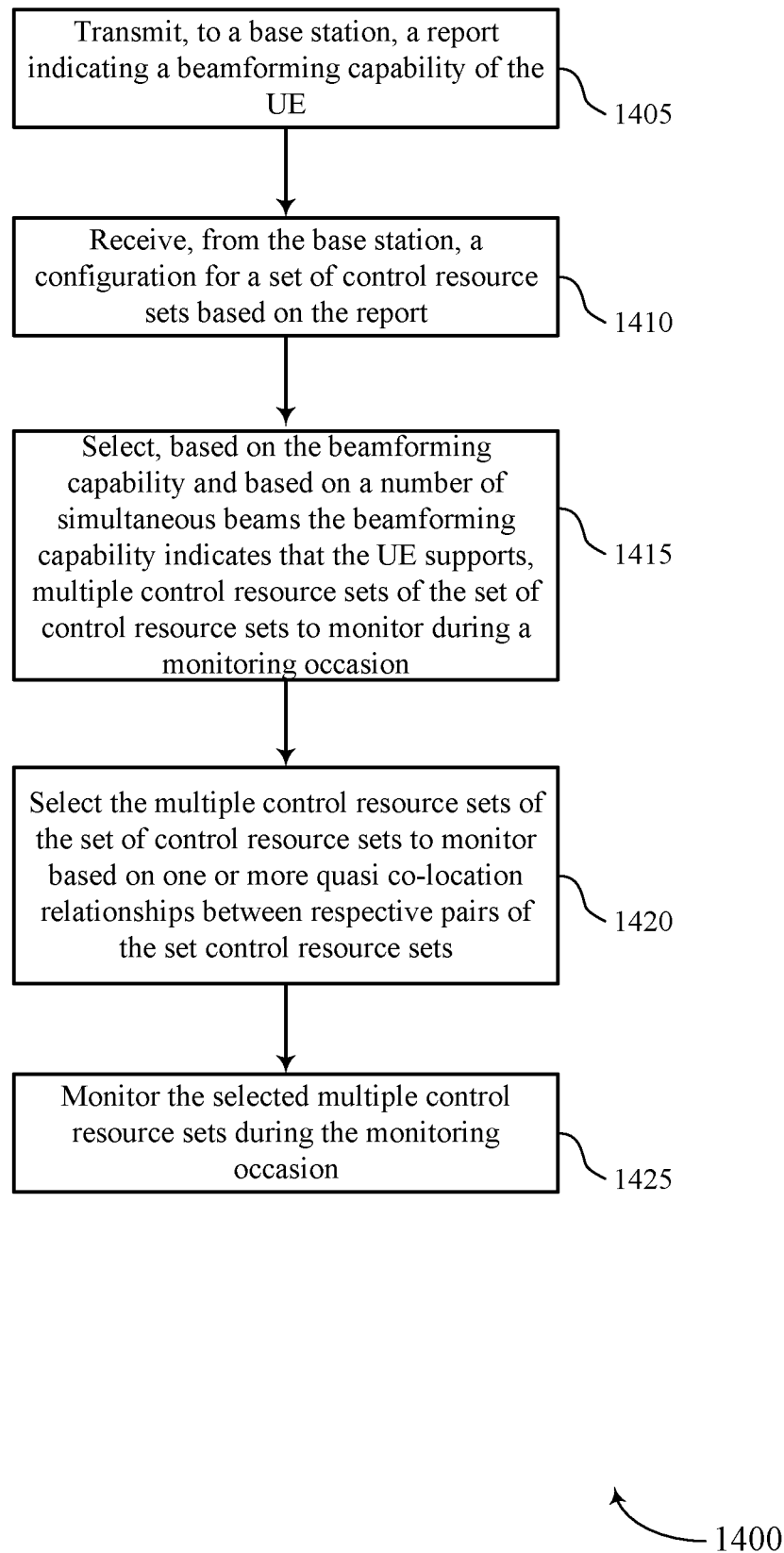

FIG. 14 shows a flowchart illustrating a method 1400 that supports synchronization signal block and physical downlink control channel search space monitoring based on user equipment beamforming capability in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may transmit, to a base station, a report indicating a beamforming capability of the UE. The operations of 1405 may be performed according to the methods described herein. In some examples, aspects of the operations of 1405 may be performed by a capability manager as described with reference to FIGS. 5 through 8.

At 1410, the UE may receive, from the base station, a configuration for a set of CORESETs based on the report. The operations of 1410 may be performed according to the methods described herein. In some examples, aspects of the operations of 1410 may be performed by a configuration manager as described with reference to FIGS. 5 through 8.

At 1415, the UE may select, based on the beamforming capability and based on a number of simultaneous beams the beamforming capability indicates that the UE supports, multiple CORESETS of the set of CORESETs (e.g., a number of the set of CORESETs) to monitor during a monitoring occasion. The operations of 1415 may be performed according to the methods described herein. In some examples, aspects of the operations of 1415 may be performed by a CORESET selector as described with reference to FIGS. 5 through 8.

At 1420, the UE may select the multiple CORESETs to monitor based on one or more quasi co-location relationships between respective pairs of the set CORESETs. The operations of 1420 may be performed according to the methods described herein. In some examples, aspects of the operations of 1420 may be performed by a CORESET selector as described with reference to FIGS. 5 through 8.

At 1425, the UE may monitor the selected multiple CORESETs during the monitoring occasion. The operations of 1425 may be performed according to the methods described herein. In some examples, aspects of the operations of 1425 may be performed by a monitoring manager as described with reference to FIGS. 5 through 8.

Figure 15:
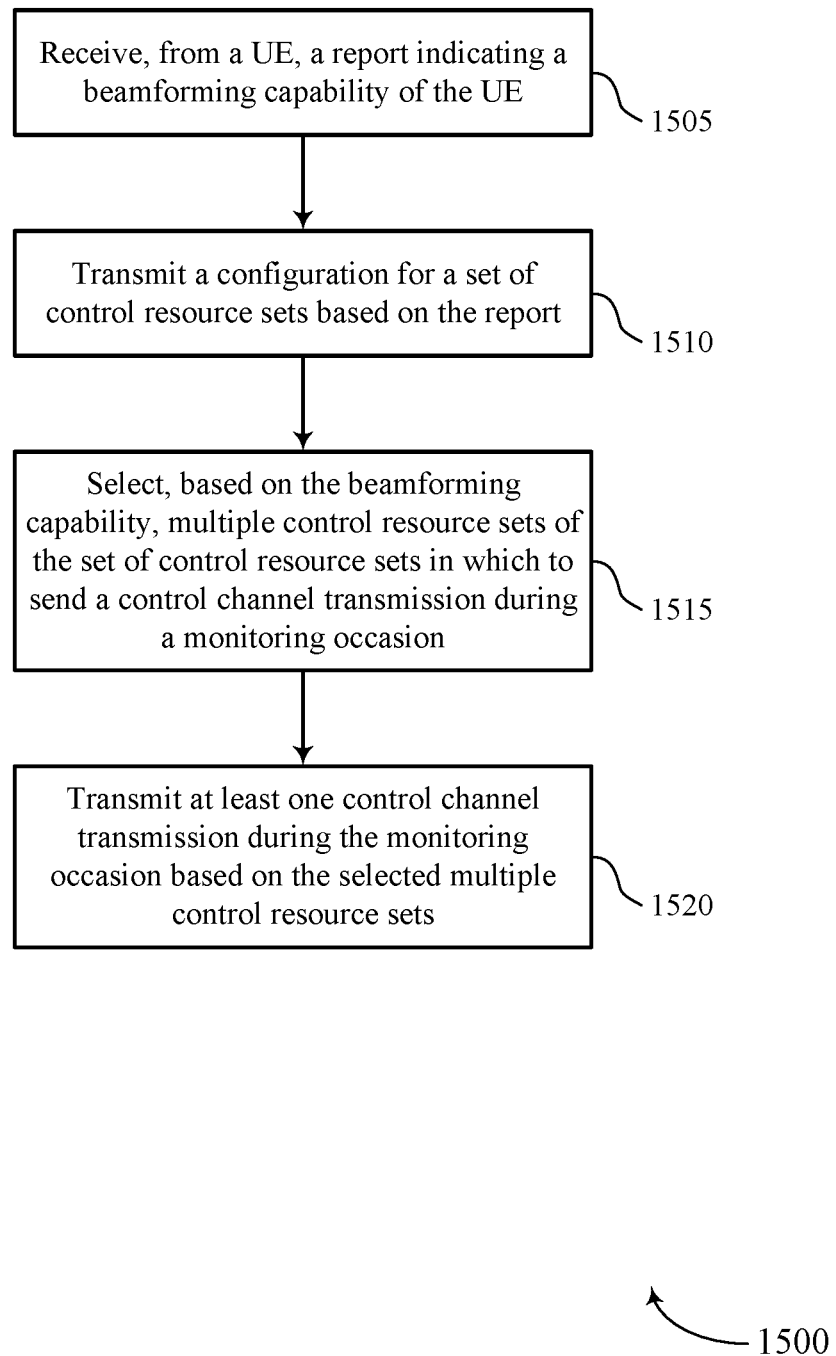

FIG. 15 shows a flowchart illustrating a method 1500 that supports synchronization signal block and physical downlink control channel search space monitoring based on user equipment beamforming capability in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may receive, from a UE, a report indicating a beamforming capability of the UE. The operations of 1505 may be performed according to the methods described herein. In some examples, aspects of the operations of 1505 may be performed by a capability manager as described with reference to FIGS. 9 through 12.

At 1510, the base station may transmit a configuration for a set of CORESETs based on the report. The operations of 1510 may be performed according to the methods described herein. In some examples, aspects of the operations of 1510 may be performed by a configuration manager as described with reference to FIGS. 9 through 12.

At 1515, the base station may select, based on the beamforming capability, a number of the set of CORESETs in which to send a control channel transmission during a monitoring occasion. The operations of 1515 may be performed according to the methods described herein. In some examples, aspects of the operations of 1515 may be performed by a CORESET selector as described with reference to FIGS. 9 through 12.

At 1520, the base station may transmit at least one control channel transmission during the monitoring occasion based on the selected number of CORESETs. The operations of 1520 may be performed according to the methods described herein. In some examples, aspects of the operations of 1520 may be performed by a control channel transmission manager as described with reference to FIGS. 9 through 12.

Figure 16:
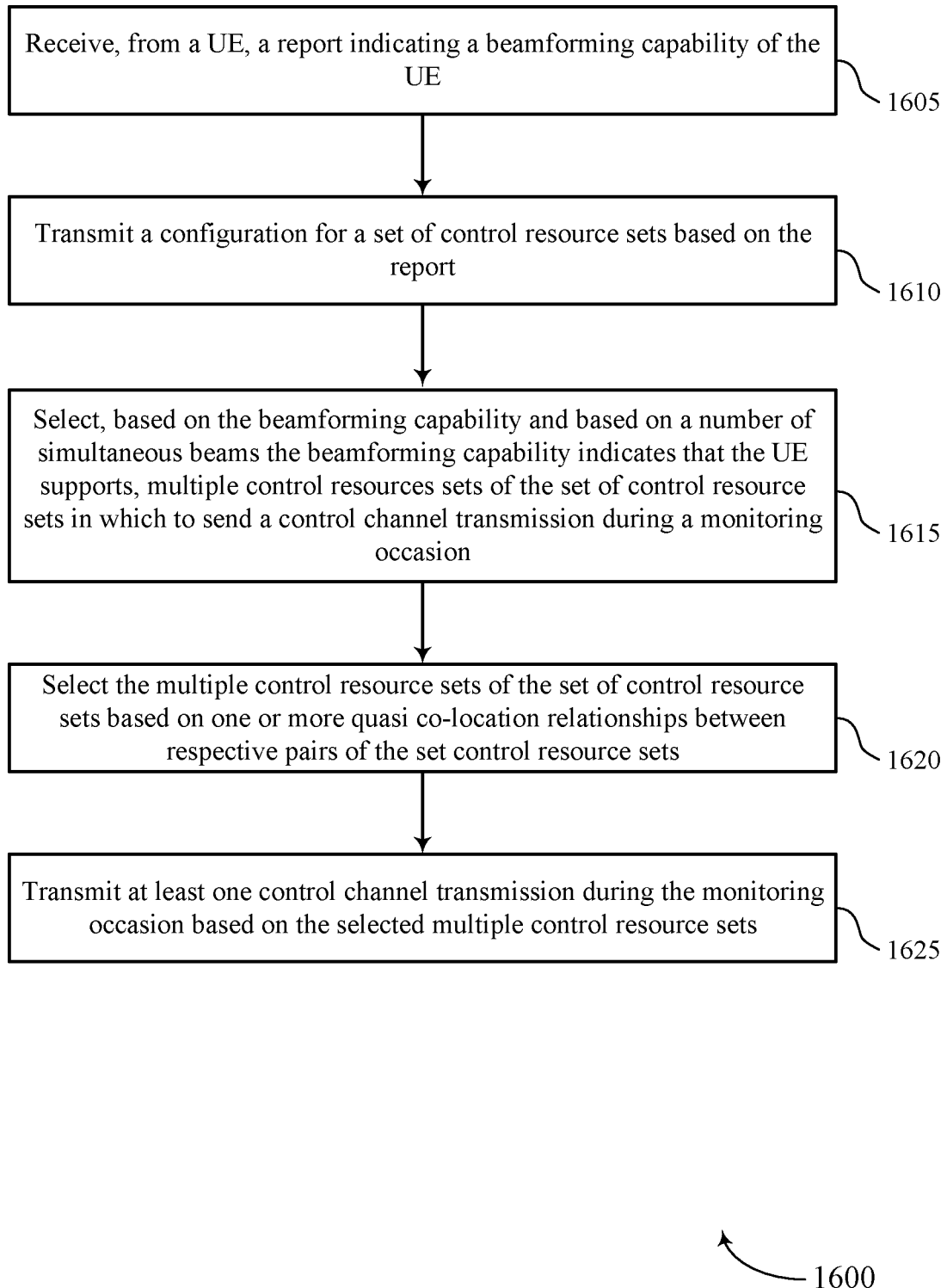

FIG. 16 shows a flowchart illustrating a method 1600 that supports synchronization signal block and physical downlink control channel search space monitoring based on user equipment beamforming capability in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may receive, from a UE, a report indicating a beamforming capability of the UE. The operations of 1605 may be performed according to the methods described herein. In some examples, aspects of the operations of 1605 may be performed by a capability manager as described with reference to FIGS. 9 through 12.

At 1610, the base station may transmit a configuration for a set of CORESETs based on the report. The operations of 1610 may be performed according to the methods described herein. In some examples, aspects of the operations of 1610 may be performed by a configuration manager as described with reference to FIGS. 9 through 12.

At 1615, the base station may select, based on the beamforming capability and based on a number of simultaneous beams the beamforming capability indicates that the UE supports, multiple CORESETs of the set of CORESETs in which to send a control channel transmission during a monitoring occasion. The operations of 1615 may be performed according to the methods described herein. In some examples, aspects of the operations of 1615 may be performed by a CORESET selector as described with reference to FIGS. 9 through 12.

At 1620, the base station may select the multiple CORESETs of the set of CORESETs based on one or more quasi co-location relationships between respective pairs of the set CORESETs. The operations of 1620 may be performed according to the methods described herein. In some examples, aspects of the operations of 1620 may be performed by a CORESET selector as described with reference to FIGS. 9 through 12.

At 1625, the base station may transmit at least one control channel transmission during the monitoring occasion based on the selected multiple CORESETs. The operations of 1625 may be performed according to the methods described herein. In some examples, aspects of the operations of 1625 may be performed by a control channel transmission manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   transmitting, to a base station, a report indicating a beamforming capability of the UE;
   receiving, from the base station, a configuration for a plurality of control resource sets based at least in part on the report;
   selecting, based at least in part on the beamforming capability and one or more quasi co-location relationships between respective pairs of the plurality of control resource sets, multiple control resource sets of the plurality of control resource sets to monitor during a monitoring occasion; and
   monitoring the selected multiple control resource sets during the monitoring occasion.

2. The method of claim 1, wherein selecting the multiple control resource sets of the plurality of control resource sets to monitor further comprises:
   selecting, based at least in part on the beamforming capability, the multiple control resource sets of the plurality of control resource sets to monitor in which at least two of the plurality of control resource sets overlap during the monitoring occasion.

3. The method of claim 2, wherein respective demodulation reference signals (DMRSs) of the at least two of the plurality of control resource sets that overlap during the monitoring occasion are not spatially quasi co-located.

4. The method of claim 1, wherein selecting the multiple control resource sets of the plurality of control resource sets to monitor further comprises:
   selecting, based at least in part on the beamforming capability, the multiple control resource sets of the plurality of control resource sets to monitor based at least in part on a number of simultaneous beams the beamforming capability indicates that the UE supports.

5. The method of claim 1, wherein the report indicates a number of receive chains at the UE.

6. The method of claim 1, wherein selecting the multiple control resource sets of the plurality of control resource sets to monitor further comprises:
   selecting, based at least in part on the beamforming capability, the multiple control resource sets of the plurality of control resource sets to monitor in which at least one of the plurality of control resource sets overlaps with at least one synchronization signal block (SSB) or channel state information reference signal (CSI-RS) during the monitoring occasion.

7. The method of claim 1, wherein selecting the multiple control resource sets of the plurality of control resource sets to monitor further comprises:
   selecting the multiple control resource sets of the plurality of control resource sets to monitor based at least in part on one or more quasi co-location relationships between respective pairs of synchronization signal blocks (SSBs) or channel state information reference signals (CSI-RSs).

8. The method of claim 1, wherein selecting the multiple control resource sets of the plurality of control resource sets to monitor further comprises:
   selecting a subset of the plurality of control resource sets that occur during the monitoring occasion based at least in part on the beamforming capability; and
   identifying, based at least in part on the configuration, a quasi co-location relationship between a first control resource set within the subset and a second control resource set that is not included within the subset, wherein the first control resource set and the second control resource set are included within the selected multiple control resource sets of the plurality of control resource sets.

9. The method of claim 8, wherein monitoring the selected multiple control resource sets during the monitoring occasion further comprises:
   monitoring the first control resource set and the second control resource set during the monitoring occasion.

10. The method of claim 8, wherein selecting the multiple control resource sets of the plurality of control resource sets to monitor further comprises:
    identifying, based at least in part on the configuration for the plurality of control resource sets, a second subset of the plurality of control resource sets that does not have a quasi co-location relationship with any control resource set within the subset.

11. The method of claim 8, wherein selecting the subset of the plurality of control resource sets further comprises:
selecting the subset of the plurality of control resource sets based at least in part on a respective index assigned to each control resource set of the plurality of control resource sets and the beamforming capability.

12. The method of claim 11, wherein selecting the subset of the plurality of control resource sets further comprises:
selecting one or more control resource sets to include in the subset up to a number of simultaneous beams the beamforming capability indicates that the UE supports.

13. The method of claim 1, wherein the selecting further comprises:
selecting the multiple control resource sets of the plurality of control resource sets to monitor based at least in part on a number of synchronization signal blocks (SSBs) or channel state information reference signals (CSI-RSs) that occur during the monitoring occasion.

14. The method of claim 13, wherein the selecting further comprises:
selecting a subset of the number of SSBs to monitor during the monitoring occasion based at least in part on the beamforming capability; and
identifying, based at least in part on the configuration for the plurality of control resource sets, a quasi co-location relationship between a first SSB within the subset and a second SSB that is not included within the subset, wherein the monitoring further comprises monitoring the first SSB and the second SSB during the monitoring occasion.

15. The method of claim 1, wherein the monitoring further comprises monitoring the multiple control resource sets and at least one synchronization signal block (SSB) or channel state information reference signal (CSI-RS) during the monitoring occasion.

16. The method of claim 1, further comprising:
selecting, based at least in part on the beamforming capability, a second multiple control resource sets of the plurality of control resource sets to monitor during a second monitoring occasion; and
monitoring the selected second multiple control resource sets of the plurality of control resource sets during the second monitoring occasion.

17. The method of claim 1, wherein the monitoring comprises:
monitoring a respective search space corresponding to each control resource set of the selected multiple control resource sets during the monitoring occasion.

18. The method of claim 1, wherein the monitoring further comprises:
receiving a demodulation reference signal within a control channel candidate corresponding to a first control resource set of the selected multiple control resource sets; and
decoding a control channel of the first control resource set corresponding to the control channel candidate based at least in part on the demodulation reference signal.

19. The method of claim 1, wherein the report indicates a number of simultaneous receive beams the UE is capable of generating.

20. The method of claim 1, wherein the report indicates a number of reference signals that are not spatially quasi co-located with respect to receive beamforming with each other that the UE is capable of simultaneously monitoring.

21. The method of claim 1, wherein the report indicates a threshold received signal strength, and wherein the UE is capable of simultaneously monitoring when the threshold is satisfied.

22. The method of claim 21, wherein the threshold is configured through one or more of downlink control information (DCI), medium access control control element (MAC-CE), and radio resource control (RRC) signaling.

23. The method of claim 1, further comprising:
identifying a respective periodicity of each of the plurality of control resource sets based at least in part on the configuration.

24. A method for wireless communications at a base station, comprising:
receiving, from a user equipment (UE), a report indicating a beamforming capability of the UE;
transmitting a configuration for a plurality of control resource sets based at least in part on the report;
selecting, based at least in part on the beamforming capability and one or more quasi co-location relationships between respective pairs of the plurality of control resource sets, multiple control resource sets of the plurality of control resource sets in which to send a control channel transmission during a monitoring occasion; and
transmitting at least one control channel transmission during the monitoring occasion based at least in part on the selected multiple control resource sets.

25. The method of claim 24, wherein selecting the multiple control resource sets of the plurality of control resource sets further comprises:
selecting, based at least in part on the beamforming capability, the multiple control resource sets of the plurality of control resource sets in which at least two of the plurality of control resource sets overlap during the monitoring occasion.

26. The method of claim 24, wherein selecting the multiple control resource sets of the plurality of control resource sets further comprises:
selecting, based at least in part on the beamforming capability, the multiple control resource sets of the plurality of control resource sets in which at least one of the plurality of control resource sets overlaps with at least one synchronization signal block (SSB) or channel state information reference signal (CSI-RS) during the monitoring occasion.

27. The method of claim 24, wherein selecting the multiple control resource sets of the plurality of control resource sets further comprises:
selecting, based at least in part on the beamforming capability, the multiple control resource sets of the plurality of control resource sets based at least in part on a number of simultaneous beams the beamforming capability indicates that the UE supports.

28. An apparatus for wireless communications at a user equipment (UE), comprising:
a transceiver,
a processor,
memory coupled with the processor; and
instructions stored in the memory and executable by the processor to cause the apparatus to:
transmit, to a base station via the transceiver, a report indicating a beamforming capability of the UE;
receive, from the base station via the transceiver, a configuration for a plurality of control resource sets based at least in part on the report;

select, based at least in part on the beamforming capability and one or more quasi co-location relationships between respective pairs of the plurality of control resource sets, multiple control resource sets of the plurality of control resource sets to monitor during a monitoring occasion; and monitor the selected multiple control resource sets during the monitoring occasion.

29. An apparatus for wireless communications at a user equipment (UE), comprising:

means for transmitting, to a base station, a report indicating a beamforming capability of the UE;

means for receiving, from the base station, a configuration for a plurality of control resource sets based at least in part on the report;

means for selecting, based at least in part on the beamforming capability and one or more quasi co-location relationships between respective pairs of the plurality of control resource sets, multiple control resource sets of the plurality of control resource sets to monitor during a monitoring occasion; and means for monitoring the selected multiple control resource sets during the monitoring occasion.

* * * * *